US006785793B2

(12) United States Patent
Aboulenein et al.

(10) Patent No.: US 6,785,793 B2
(45) Date of Patent: Aug. 31, 2004

(54) METHOD AND APPARATUS FOR MEMORY ACCESS SCHEDULING TO REDUCE MEMORY ACCESS LATENCY

(75) Inventors: Nagi Aboulenein, Portland, OR (US); Randy B. Osborne, Beaverton, OR (US); Ram Huggahalli, Portland, OR (US); Vamsee K. Madavarapu, Folsom, CA (US); Ken M. Crocker, Ashland, OR (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 09/966,957

(22) Filed: Sep. 27, 2001

(65) Prior Publication Data

US 2003/0061459 A1 Mar. 27, 2003

(51) Int. Cl.[7] .............................................. G06F 12/00
(52) U.S. Cl. ...................................... 711/167; 711/154
(58) Field of Search ................................ 711/167, 100, 711/154

(56) References Cited

U.S. PATENT DOCUMENTS

| 6,154,826 | A | * | 11/2000 | Wulf et al. ................. 711/217 |
| 6,173,345 | B1 | | 1/2001 | Stevens |
| 6,418,525 | B1 | | 7/2002 | Charney et al. |
| 6,510,497 | B1 | * | 1/2003 | Strongin et al. ............ 711/151 |
| 6,546,439 | B1 | * | 4/2003 | Strongin et al. ............. 710/52 |
| 2002/0065981 | A1 | * | 5/2002 | Jenne et al. ................ 711/105 |

FOREIGN PATENT DOCUMENTS

| EP | 0473302 A | 3/1992 |
| EP | 0940757 A2 | 9/1999 |
| WO | WO01/16715 A | 3/2001 |

OTHER PUBLICATIONS

Notification of Transmittal of International Search Report, International Application No. PCT/US 02/31161, Nov. 10, 2003.

* cited by examiner

*Primary Examiner*—Kimberly McLean-Mayo
(74) *Attorney, Agent, or Firm*—Blakely, Sokoloff, Taylor & Zafman LLP

(57) ABSTRACT

A device is presented including a memory controller. The memory controller is connected to a read request queue. A command queue is coupled to the memory controller. A memory page table is connected to the memory controller. The memory page table has many page table entries. A memory page history table is connected to the memory controller. The memory history table has many page history table entries. A pre-calculated lookup table is connected to the memory controller. The memory controller includes a memory scheduling process to reduce memory access latency.

56 Claims, 20 Drawing Sheets

METHOD AND APPARATUS FOR MEMORY ACCESS SCHEDULING TO REDUCE MEMORY ACCESS LATENCY

BACKGROUND OF THE INVENTION

1. Field of the Invention

This invention relates to memory controllers, and more particularly to a method and apparatus for reducing memory access latencies and improving bandwidth.

2. Description of the Related Art

Modern memory, such as dynamic random access memory (DRAM), is used throughout the computer industry. Memory is organized into pages. Each page of memory contains data for a number of contiguous memory locations. Memory devices, such as DRAM, are further organized into a small number of banks per DRAM device (e.g., four banks). Each of these devices have many pages per bank. Only a single page can be accessed from a bank at a time. Before a particular page within a bank can be accessed, that page must be opened using an "activate" command. This activate command is also known as a "row" command. A memory request requiring a page to be opened is called a page-empty access request. A memory request to a page that has already been opened is known as a page-hit access request. A page may be closed using a pre-charge command.

If page P0 is open when a request is received to access a location in page P1 that happens to be located in the same memory bank as P0, page P0 must first be closed before page P1 can be opened. A page conflict, such as this, occurs when one page must be closed before a desired page can be opened. This situation is known as a page-miss access.

Memory access latency is much greater for page misses than for page hits. Page hit and page empty accesses to different memory banks may be interleaved such that available data bandwidth may be maintained. Page miss accesses, however, typically result in a reduction of available data bandwidth. Therefore, page misses are particularly detrimental for DRAM performance.

Synchronous DRAM double data rate (SDRAM/DDR) memory technology has a small number of DRAM banks. SDRAM/DDR memory is a type of SDRAM that supports data transfers on both edges of each clock cycle, effectively doubling the memory chip's data throughput. Due to SDRAM/DDR memory containing a small number of memory banks can lead to performance bottlenecks because of page miss and page empty accesses. This performance bottleneck can lead to increased memory latency and lower bandwidth, thus, lower platform performance. In memory controllers there is a dilemma in whether to keep pages open until a page conflict occurs at which point the page is closed, or pages can be closed aggressively. Neither of these techniques, however, is optimal for all workloads.

SDRAM/DDR memory provides a mechanism called auto-pre-charge, which can be used to automatically pre-charge (close) a memory bank as soon as a memory request is completed. This can be useful in developing a page-closing policy that is more suited for SDRAM/DDR memory devices. An advantage that can be seen by having an automatic pre-charge policy, as compared to a policy that issues an explicit pre-charge command, is that it obviates the need for an explicit pre-charge command. This can reduce the DRAM command bus available bandwidth. Therefore, freeing up command bus slots for other commands. An auto-pre-charge policy, however, not only converts all page-miss accesses to page-empty accesses (i.e., reducing latency), but the auto-pre-charge policy also does the same for all page-hit accesses. Therefore, resulting in longer latency for accesses that would have just reused a page already opened for an earlier request. Depending on the amount of locality present in the access stream, a substantial loss of performance can result.

Existing DRAM technology typically issue a series of DRAM commands to DRAM devices connected in the system. These DRAM commands cause the DRAM device to perform various functions, such as close a previously opened page (pre-charge), open a new page (activate) and read data from or write data to a DRAM device. For electrical reasons, a certain amount of time must be allowed to pass between successive commands to a same DRAM memory bank. This allotted time is specified in the manufacturers' specifications and is known as DRAM timing constraints. FIG. 1 illustrates examples of commands issued to read data from memory, as well as associated timing constraints. DRAM commands stream 100 illustrates reading from an idle DRAM bank (page empty). DRAM command stream 105 illustrates reading from a DRAM bank with another page open (page miss). As illustrated in DRAM command streams 100 and 105, when DRAM commands for successive memory accesses are issued sequentially, the DRAM subsystem will remain idle during the times allocated for time constraints. If these idle DRAM command bus slots are not otherwise used, this can lead to reduced memory system efficiency and lower performance.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to a method and apparatus for reducing latencies due to memory controller scheduling and memory access. Referring to the figures, exemplary embodiments of the invention will now be described. The exemplary embodiments are provided to illustrate the invention and should not be construed as limiting the scope of the invention.

Figure 1:
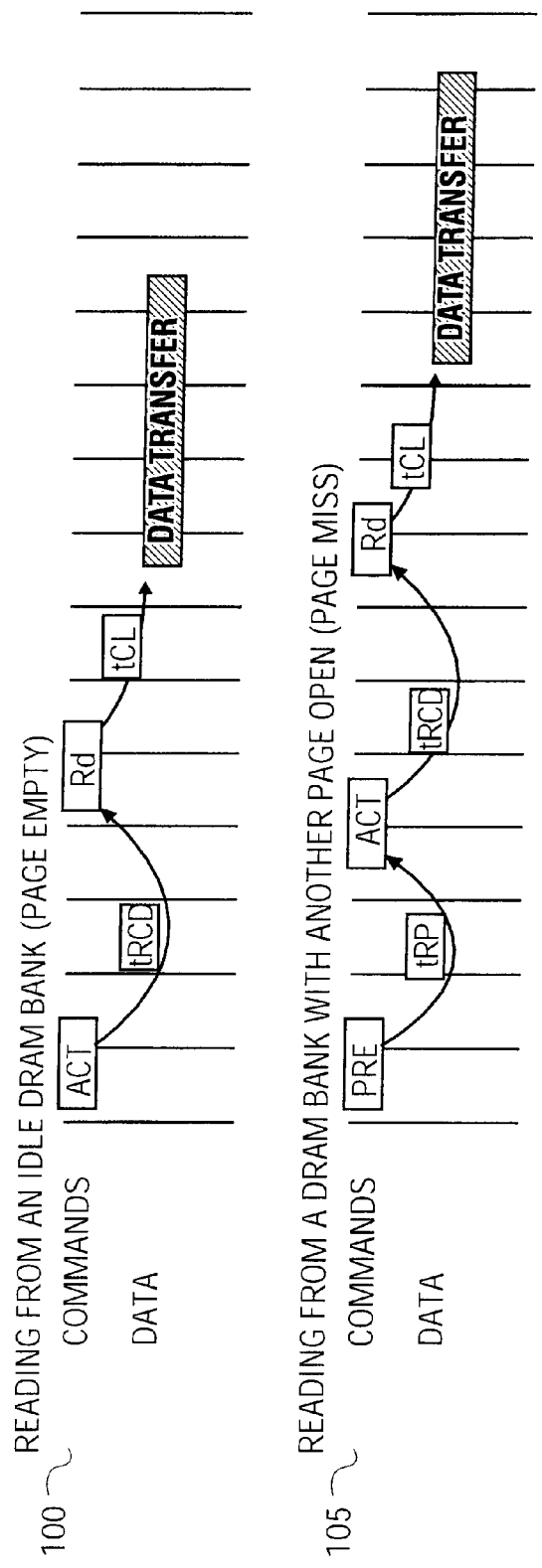
FIG. 1 illustrates examples of commands issued to read data from memory, as well as associated timing constraints.
Figure 2:
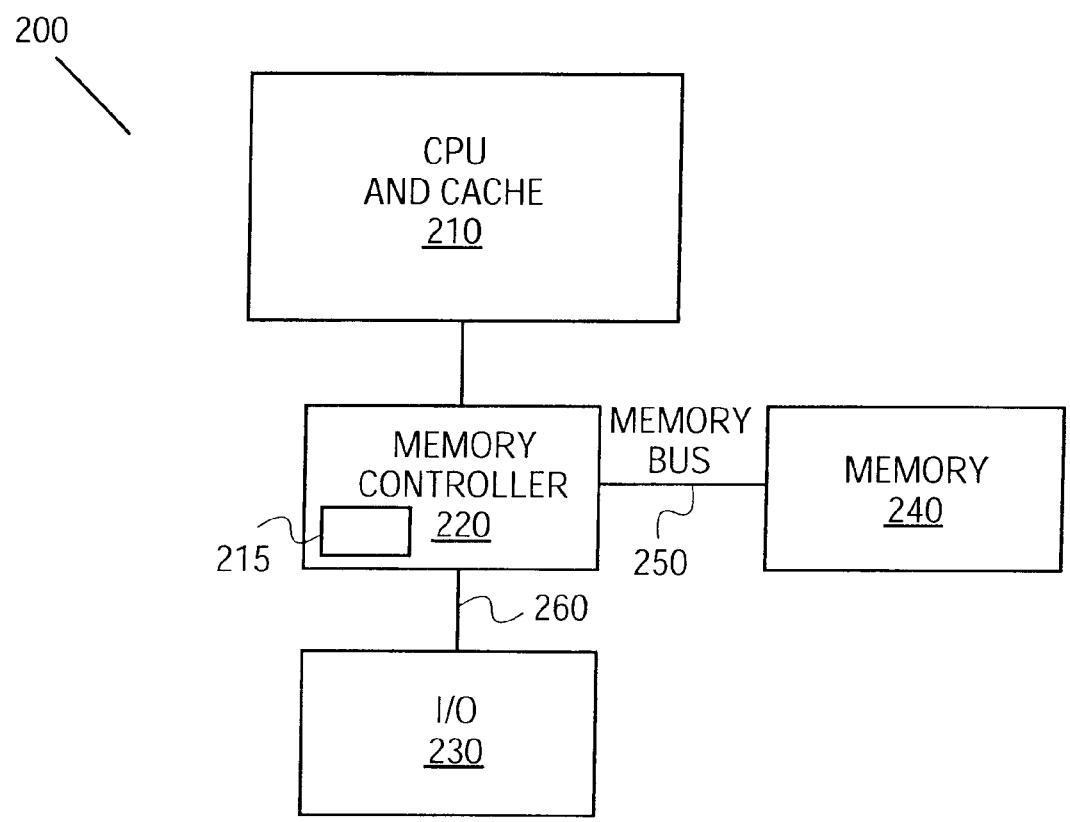
FIG. 2 illustrates an embodiment of the invention comprising a system including a memory controller.

FIG. 2 illustrates an embodiment of the invention comprising system 200. System 200 comprises central processing unit (CPU) and Cache 210, memory controller 220, input/output (I/O) 230, main memory 240, and memory bus 250. Note that CPU and cache 210, and memory controller 220 may reside on the same chip. Main memory 240 may be dynamic random access memory (DRAM), synchronous DRAM (SDRAM), SDRAM/double data rate (SDRAM/DDR), Ram bus DRAM (RDRAM), etc. In one embodiment of the invention, Memory controller 220 comprises intelligent auto-pre-charge process 215.

Figure 3:
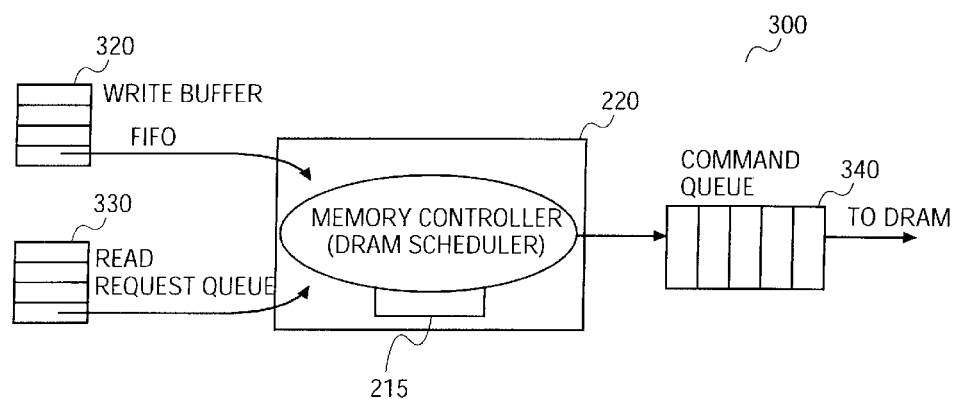
FIG. 3 illustrates an embodiment of the invention comprising a memory controller including an intelligent auto-pre-charge process.

FIG. 3 illustrates an embodiment of the invention having scheduling means for reducing memory access latency and improving bandwidth comprising intelligent auto-pre-charge process 215. Circuit 300 comprises memory controller section 220, Write buffer 320, Read request queue 330, and Command queue 340. Memory controller section 220 comprises intelligent auto-pre-charge process 215. Memory controller 220 also comprises a memory scheduler.

In one embodiment of the invention, Intelligent auto-pre-charge process 215 allows selective enabling of automatic pre-charge operations. Selective enabling of automatic pre-charge operations is handled by checking whether further accesses to an open page are in memory controller 220, 320 and 330's request queues. There, it is determined whether or not to proceed with an automatic pre-charge. If no other request to the open page can be detected, automatic pre-charge is allowed to proceed. Otherwise, if there is no conflict with subsequent requests are detected, then automatic pre-charge operations are cancelled, by disabling a bit indicating whether to pre-charge after access.

Delaying of an auto-pre-charge determination as long as possible is also provided by an embodiment of the invention. By delaying as long as possible the auto-pre-charge determination, chances of another request arriving at an open page are increased. Therefore, more page-hit accesses can occur.

In one embodiment of the invention, Intelligent auto-pre-charge process 215 in memory controller 220 selects one request at a time from read request queue 330 or write buffer 320. Intelligent auto-pre-charge process 215 then generates DRAM commands necessary for that request and places them into command queue 340. From command queue 340, commands are shifted out onto a DRAM command bus. It should be noted that other embodiments of the invention can be implemented without command queue 340, such as a finite state machine implementation of the scheduler.

Figure 4:
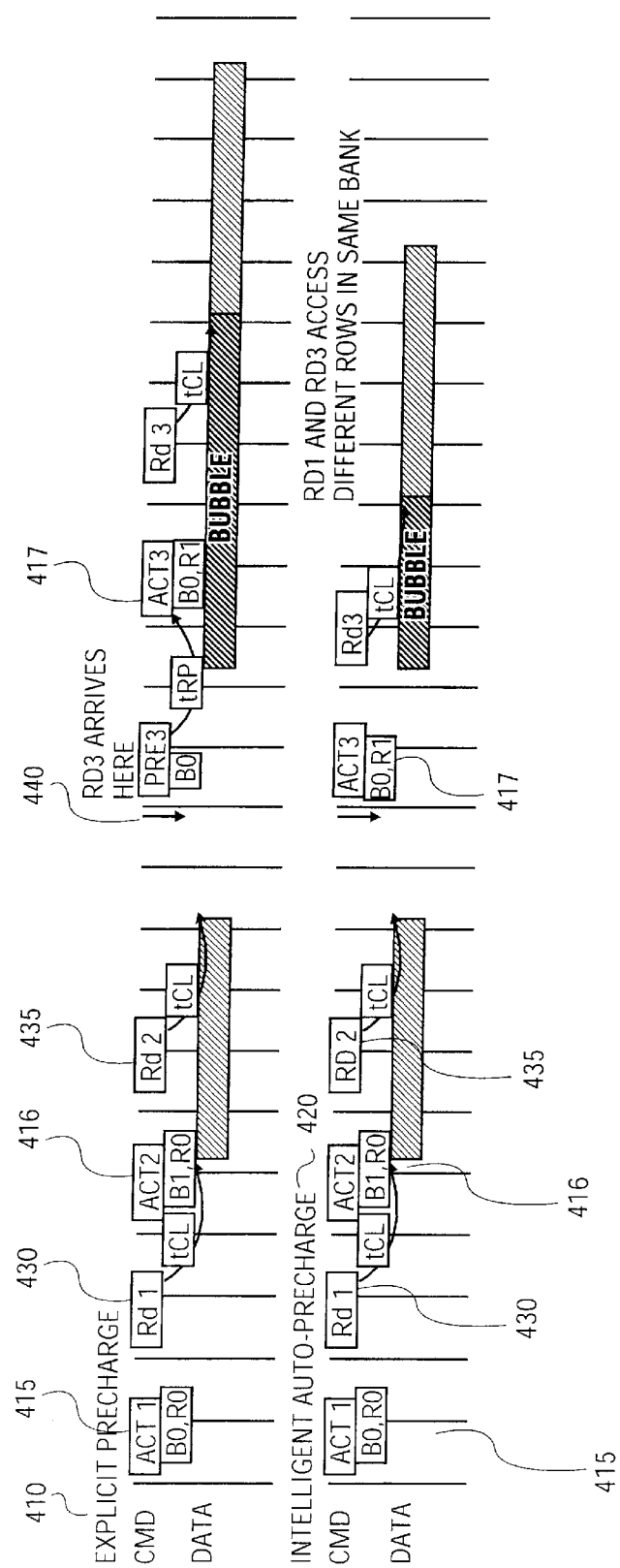
FIG. 4 illustrates a comparison of explicit pre-charge commands as compared with an embodiment of the invention having an intelligent auto-pre-charge process.

FIG. 4 illustrates a comparison of explicit pre-charge commands as compared with an embodiment of the invention having intelligent auto-pre-charge process 215. FIG. 4 demonstrates, qualitatively, how intelligent auto-pre-charge process 215 can improve performance over typical approaches by reducing the number of page-miss accesses (converted to page-empty, with reduction in latency), and by reducing the required command bandwidth.

As can be seen in timeline 410, a first request 415 accesses a location in bank 0, page 0 (i.e., B0, R0). Second request 416 accesses a location in bank 1, page 0 (i.e., B1, R0). Memory request three 417 accesses a location in bank 0, page 1 (i.e., B0, R1; the same bank as request one 415, but a different memory page). Timeline 420 has similar requests one 415, request two 416, and request three 417. Timeline 420, however, uses an embodiment of the invention having intelligent auto-pre-charge process 215. In timeline 410 and 420, first read 430 occurs after first request 415. In timeline 410, when read request 440 occurs, a pre-charge request to bank 0 (i.e., bank 0 is closed) is needed. Whereas, in timeline 420, the pre-charge request is cancelled. Therefore, third request 417 occurs without a latency as compared with timeline 410.

In one embodiment of the invention, Intelligent auto-pre-charge process 215 in memory controller 220 dynamically determines to precharge (close) a memory page or not to precharge a memory page based on varying system loads. In this embodiment of the invention, the determination of precharging or not upon issuance of a CAS operation accessing a memory page, is based upon the existance (or lack thereof) of further requests in memory controller's 220 request queue.

In one embodiment of the invention, the determination to precharge a memory page or not is based on the following circumstances. A first condition is that memory controller's 220 request queue is empty. That is, memory controller 220 does not have any further requests at the current time. In this condition, the page is left open, and an auto-precharge operation associated with the CAS command is cancelled.

Another condition is that memory controller's 220 request queue is not empty, however, the request queue does not contain any further requests to the same page. In this condition, the auto-precharge operation is not cancelled, and the page is automatically closed when the CAS operation is completed.

A further condition is that memory controller's 220 request queue is not empty, and a subsequent request is found to the same page. In this condition, the page is left open, and the auto-precharge operation associated with the CAS operation is cancelled.

Figure 5:
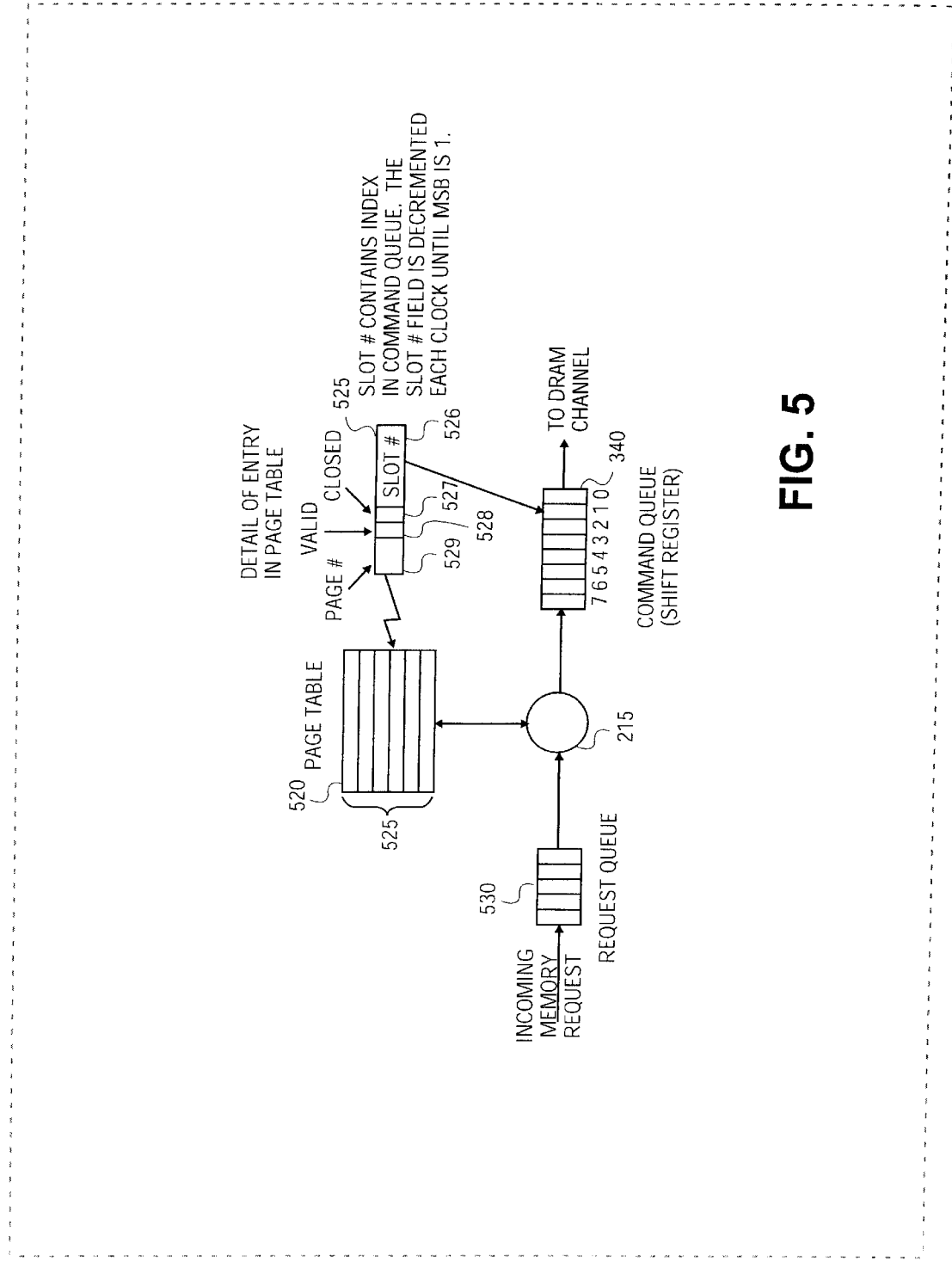
FIG. 5 illustrates an embodiment of the invention including a page table.

FIG. 5 illustrates an embodiment of the invention having page table 520, plurality of table entries 525, read request queue 530, intelligent auto-pre-charge process 215, and command queue 340. In one embodiment of the invention, each page entry 525 comprises slot # field 526, which contains the number of a slot in command queue 340. Slot field 526 is used to point to the previous column address signal (CAS) command in command queue 340 for a memory page. Once initialized, slot # field 526 decrements once for each time that command queue 340 shifts the shift register. Slot # field 526 has a width that is one bit wider than the number of bits necessary to enumerate all the slots in command queue 340. Once slot # field 526 rolls over (e.g., from 0000 to 1111), the decrementing stops. Therefore, the most significant bit indicates its slot # field 526 is valid or not. Each page table entry 525 also comprises memory page number 529, validity bit 528, and closed bit 527. Closed bit 527 indicates if the page is closed or not at that scheduling point. In one embodiment of the invention, command queue 340 has a plurality of entries, each of which contains a field for a command, an address and a auto-pre-charge control bit. It should be noted that other known techniques can be implemented in other embodiments of the invention without diverging from the functionality of page table 520.

In one embodiment of the invention, intelligent auto-pre-charge process 215 uses page table entry 525 as follows: if an access command for a memory page is issued and there is no entry for that page in the page table, or if the page table indicates that the page is currently closed, intelligent auto-pre-charge process 215 schedules a bank activate (ACT) command in command queue 340 and then schedules a CAS command in command queue 340. The CAS command has the auto-pre-charge bit provisionally set. Intelligent auto-pre-charge process 215 updates page table entry 525 to point to the slot in which the CAS command is scheduled. Once the CAS command gets to the head of command queue 340, the CAS command is issued with the current value of the auto-pre-charge bit. If, however, there is a prior access to the page in command queue 340, and there are not any page conflicts, intelligent auto-pre-charge process 215 clears the auto-pre-charge bit in command queue 340's slot pointed to by that page table entry. Intelligent auto-pre-charge process 215 then schedules a CAS command for the current access and updates page table entry 525 to point to command queue 340's slot in which the CAS command was scheduled. If, however, there is a page conflict, the page is allowed to be closed by the auto-pre-charge command and the page table is updated to indicate that the page is closed. When a subsequent access arrives for that page, the foregoing is repeated.

Figure 6:
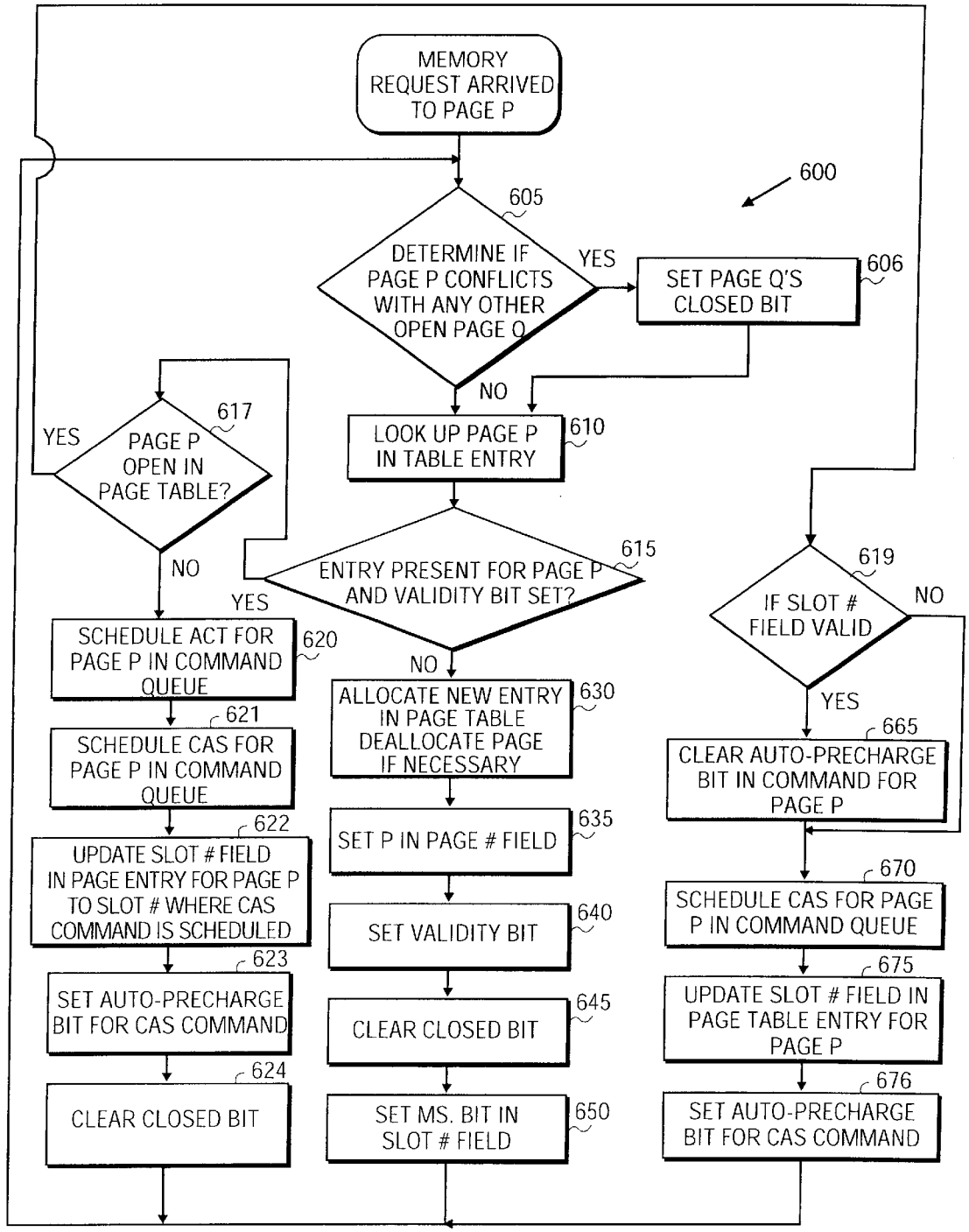
FIG. 6 illustrates a block diagram of an embodiment of the invention having an intelligent auto-pre-charge process.

FIG. 6 illustrates a block diagram of an embodiment of the invention having an intelligent auto-pre-charge process 600. When a memory request to a page "P" arrives, process 600 begins with block 605, which determines if page "P" conflicts with any other open page "Q" in the page table having the same bank of memory that is of the same rank. If block 605 does determine that a page P conflicts with any other page Q, then process 600 continues with block 606 which, sets page Q's closed bit. From block 606 process 600 continues with block 610. If, however, block 605 determines that page P does conflict with another page Q, then process 600 continues directly with block 610. Block 610 looks up page P in the page table. Process 600 then continues with block 615 which, determines if an entry is present for page P and if the validity bit is set. If an entry is present for page P and the validity bit is set, process 600 continues with block 617.

Block 617 determines whether page P is open in the page table. If block 617 does determine that page P is open in the page table, then process 600 continues with block 619. Block 619 determines if slot # field 526 is valid (note that in one embodiment of the invention a valid state means the most significant bit is "0," for other embodiments of the invention, alternative setting of bits means slot # field 526 is valid). If block 619 does determine that slot # field 526 is valid, process 600 continues with block 665. If block 619 determines that slot # field 526 is not valid, process 600 continues with block 670.

If block 617 determines that page P is not open in the page table, process 600 continues with block 620. Block 620 schedules an ACT command for page P in command queue 340. Next, block 621 schedules a CAS command for page P in command queue 340. Block 622 then updates slot # field 526 in page table entry 525 for page P to contain the slot number in which the CAS command is scheduled. Block 623 then sets the auto-pre-charge bit for the CAS command in command queue 340. Block 624 then clears the closed bit.

If, however, after page P is looked up in the page table at block 610 and an entry for page P is not present, then process 600 continues with block 630. Block 630 allocates a new entry in page table 520 (e.g., reclaim the least recently used entry with a most significant bit set in slot # field 526) and deallocates a page if necessary. Block 635 then sets page P's page number in page number field 529. Block 640 sets validity bit 528. Block 645 then clears closed bit 527. Then block 650 sets the most significant bit in slot # field 526. From block 650, process 600 continues with block 605.

Block 665 clears the auto-pre-charge bit in the slot in command queue 340 that is indicated by slot # field 526 in page table entry 525 for page P. Block 670 then schedules a CAS command for page P in command queue 340. Block 675 then updates slot # field 526 in page table entry 525 for page P to contain the slot number in which the CAS command is scheduled in command queue 340. Block 676 then sets the auto-pre-charge bit for the CAS command in command queue 340. Process 600 then continues with block 605.

By keeping pages open or closing pages based on the request queue, intelligent auto-pre-charge process 215 adapts to the workload and improves performance. There are, however, a small number of workload types for which embodiments of the invention having intelligent auto-pre-charge process 215 may reduce performance. For example, a workload having high locality but having a large enough interval between successive requests to the same page such that, by the time a request must be issued on the memory command bus, the next request for that page has not yet arrived. Therefore, intelligent auto-pre-charge process 215 would close the page, resulting in page empties instead of page hits.

To overcome workload types for which intelligent auto-pre-charge process 215 may have reduced performance, one embodiment of the invention uses information from prior memory requests to predict whether a subsequent request will be to the same page in the near future, thus the page should be kept open. Alternatively, one embodiment of the invention determines whether there is likely to not be a request to the same page in the near future and thus, the page should be closed.

Figure 7:
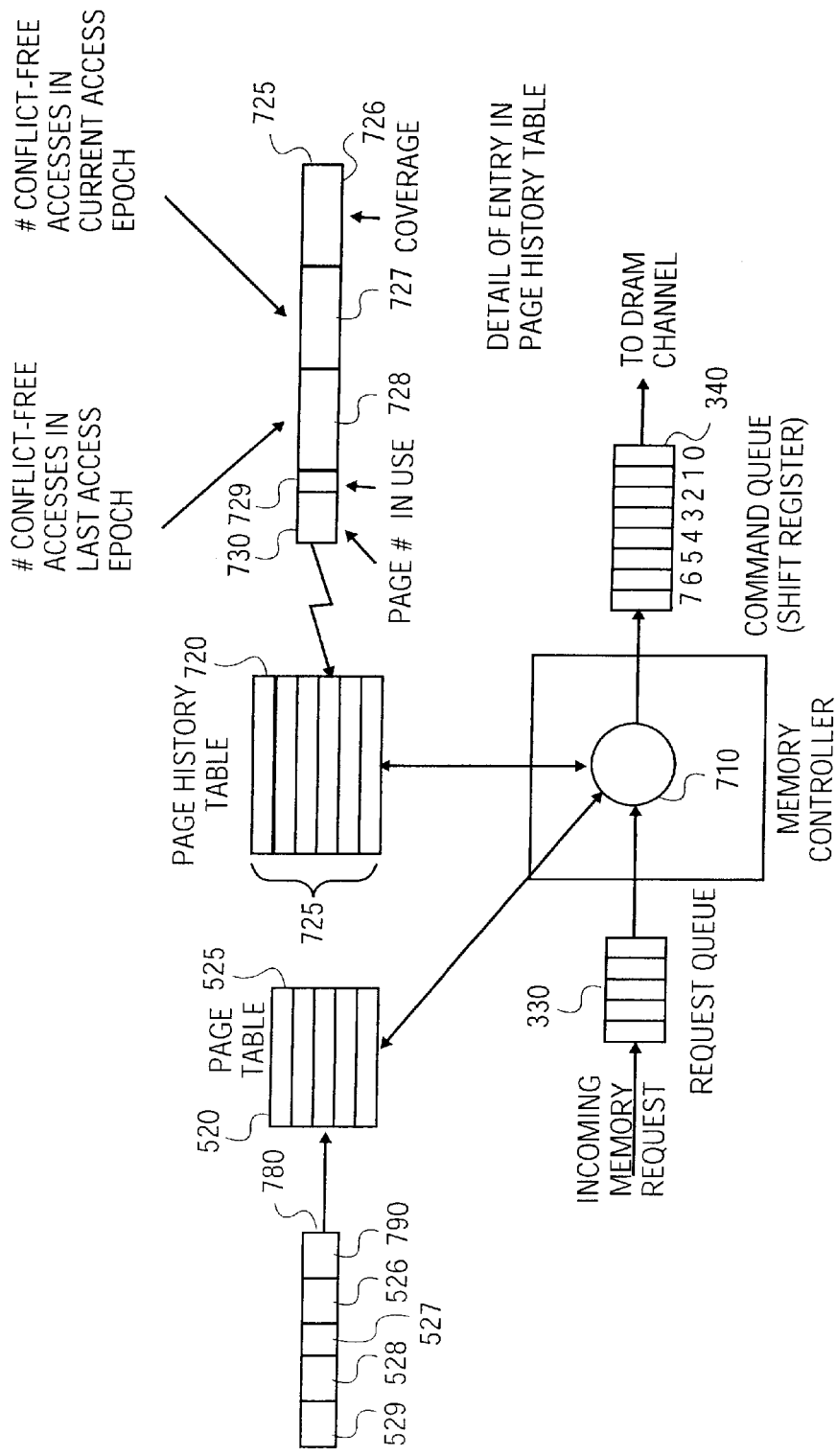
FIG. 7 illustrates an embodiment of the invention comprising a memory controller with a page access prediction process.

FIG. 7 illustrates an embodiment of the invention having scheduling means for reducing memory access latency and improving bandwidth comprising page access prediction process 710. The embodiment of the invention illustrated in FIG. 7 includes memory controller 220, page access prediction process 710, page history table 720, and page table 520. Page table 520 has a plurality of page table entries 525. Each page table entry 780 has a timer field 790. Page table entry Page history table 720 comprises a plurality of page history entries 725. Page history entry 725 has coverage field 726, number of conflict-free accesses in current access epoch 727, number of conflict-free accesses in last access epoch 728, in-use bit 729 and memory page number field 730.

Page history table 720 contains information on pages previously accessed and information on the accesses to pages currently open. The number of conflict-free accesses is determined (conceptually) by keeping track of how many accesses there would be to that page if the page were kept open as long as possible prior to when the page was last closed. This measure can be computed by starting at the first time a page is open after a conflict, and counting the number of accesses to that same page until that page is closed due to a conflict. Page coverage 726 is the fraction of the total page that has been accessed. In one embodiment of the invention, page coverage 726 is implemented using a bit vector where each bit indicates if a particular cache line within the page has been accessed.

In one embodiment of the invention, the historical information in page history table 720 from the last access to a page (# conflict-free accesses in last access epoch 728) is used to predict when to close that page in the next access epoch. If this historical information is not available (since that page was not previously accessed or was accessed so long ago that its information was evicted from the page history table), then the historical information from the page of the prior access (# conflict-free accesses in the current access epoch 727) is used to predict when to close that page.

FIG. 8 illustrates a block diagram of an embodiment of the invention having page access prediction process 800. Page access prediction process 800 begins with block 805, where a request for page P is received by memory controller 220. Block 810 determines if a match is found for the requested page "P" in page history table 720. If a match is not found for page P, process 800 continues with block 820. Block 820 deallocates the oldest entry in page history table 720. Next, block 821 uses the deallocated entry in page history table 720 to allocate information for the page number in the present request. Block 822 initializes # conflict-free accesses in last epoch 728 to # conflict-free accesses in current epoch 727 of the youngest entry in page history table 720. Block 823 sets # conflict-free accesses in current epoch 727 to 0. Block 824 sets coverage 726 to 0. Block 825 sets page in-use bit 729.

If a match was found for page P in history table 720, process 800 then continues with block 811. Block 811 retrieves # conflict-free accesses in last epoch 728 and # conflict-free accesses in current epoch 727. Block 815 determines if page P is already marked in-use. If the page is already marked in-use, then process 800 continues with block 816 which, retrieves the coverage. If the page was not already marked in-use, then process 800 continues with block 824 as previously discussed.

After block 825 is completed, process 800 continues with block 830 which, determines if scheduling of the current requested page P results in a page conflict with another page "Q" to the same bank and same rank. If it is determined there is a conflict with another page Q, then block 831 closes page Q. Page Q's associated page history table entry 725 is updated as follows. In block 832, # conflict-free accesses in last epoch 728 is set to # conflict-free accesses in current epoch 727. Block 833 then sets # conflict-free accesses in current epoch to 0 for page Q. Block 834 then sets # conflict-free accesses in current epoch to 0 for page P. Block 835 then clears in-use-bit 729.

If no conflicts exist, or after block 835 completes, process 800 continues with block 836. In block 836 the request for page P is scheduled. In block 840 it is determined whether # conflict-free accesses in last epoch 728 to page P is greater than # conflict-free accesses in current epoch 727 to page P. If it is determined that # conflict-free accesses in last epoch 728 is not greater than # conflict-free accesses in current epoch 727, then page P is closed in block 847.

If block 840 determines that # conflict-free accesses in last epoch 728 is greater than # conflict-free accesses in current epoch 727, then process 800 continues with block 845. Block 845 determines whether coverage is less than 100%. If coverage is not less than 100%, process 800 continues with block 847 and page P is closed. If coverage is less than 100%, then process 800 continues with block 846 where page P is kept open.

Process 800 continues with block 850 where # conflict-free accesses in current epoch 727 is incremented. Block 851 then updates coverage field 726. Block 855 determines whether the page was closed due to a conflict. If the page was not closed due to a conflict, then block 856 clears in-use-bit 729. If the page was closed due to a conflict, then process 800 continues with block 805.

Figure 8A:
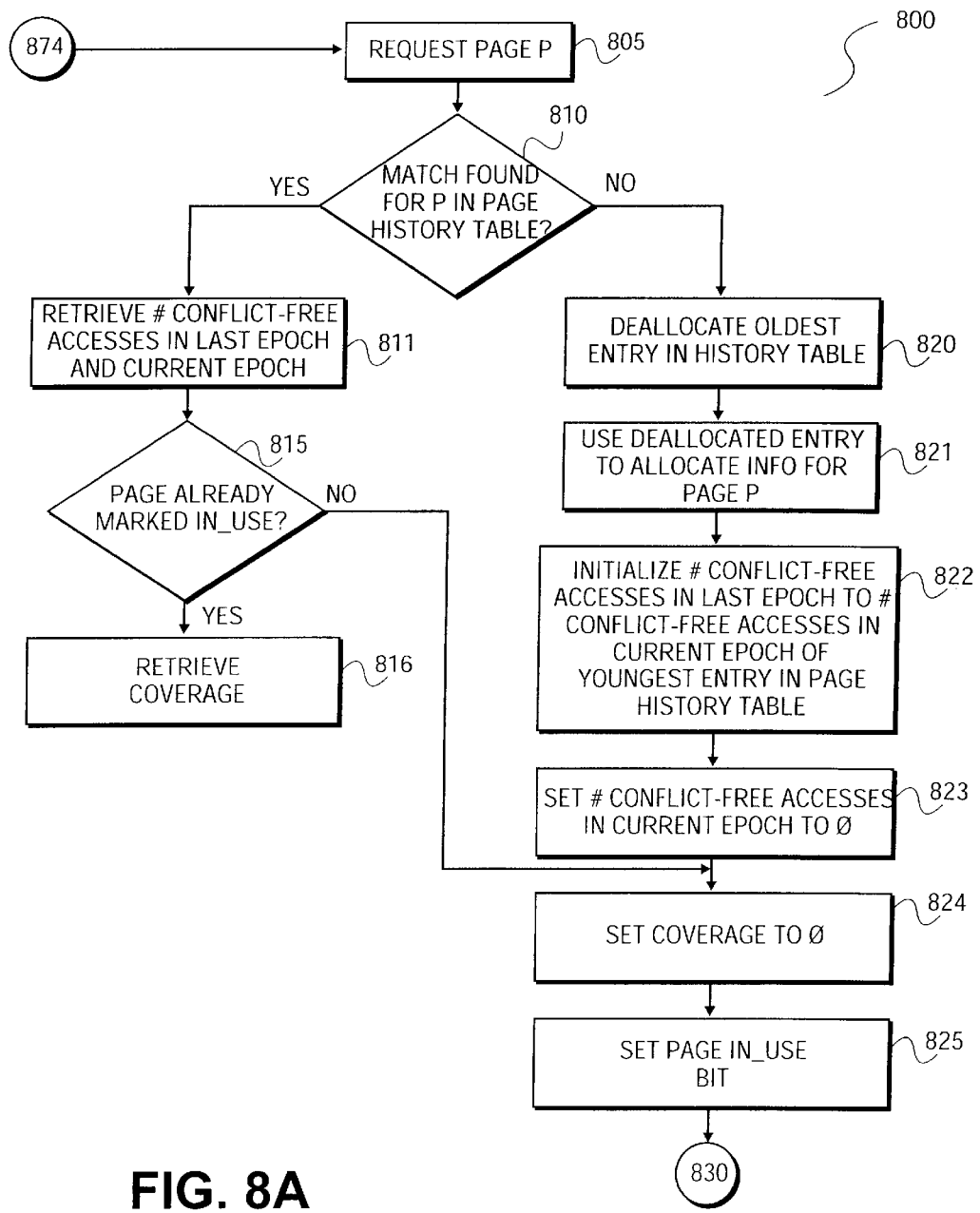
FIG. 8A illustrates a block diagram of an embodiment of the invention having a page access prediction process.
Figure 8B:
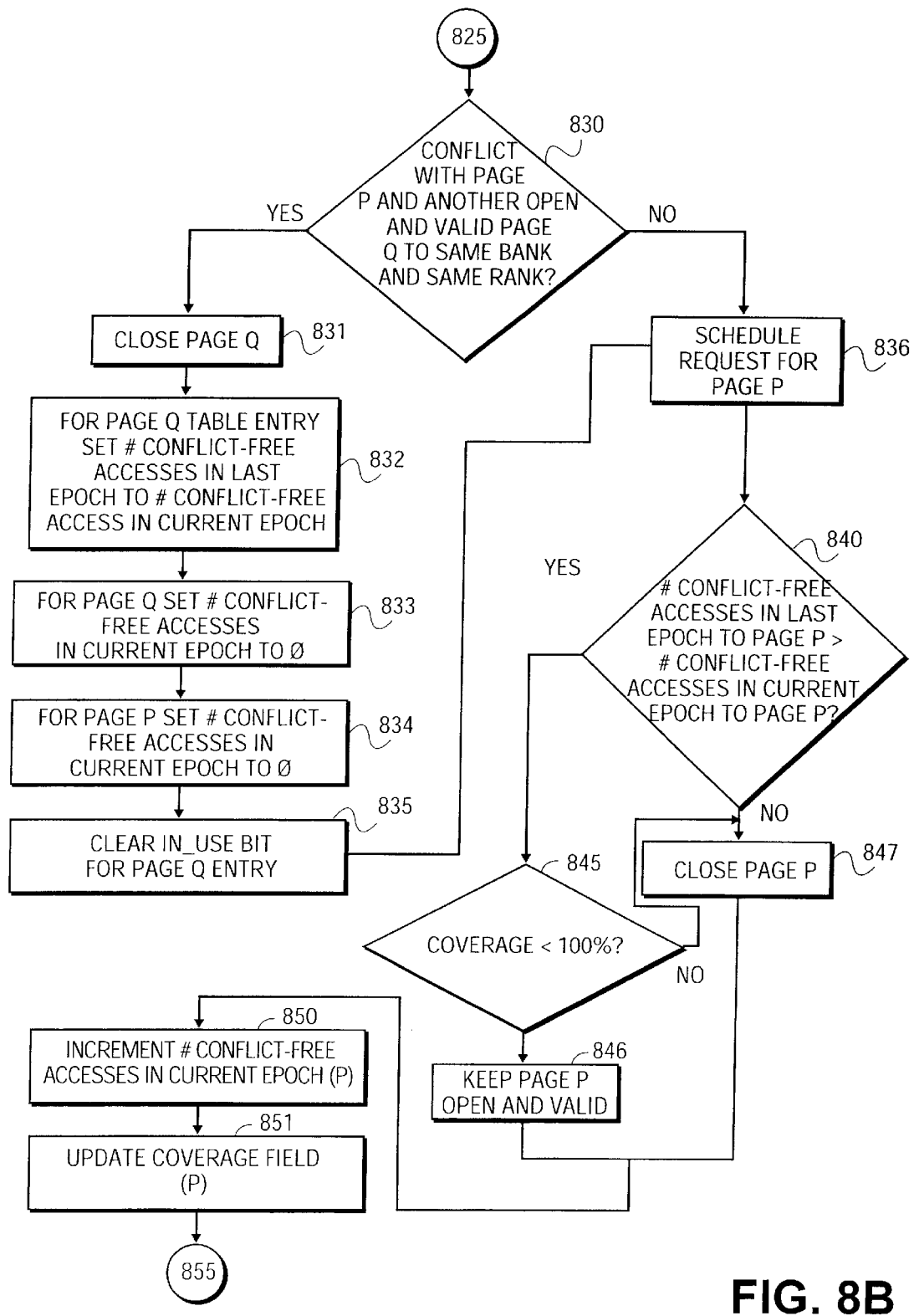
FIG. 8B illustrates a block diagram of an embodiment of the invention having a page access prediction process.
Figure 8C:
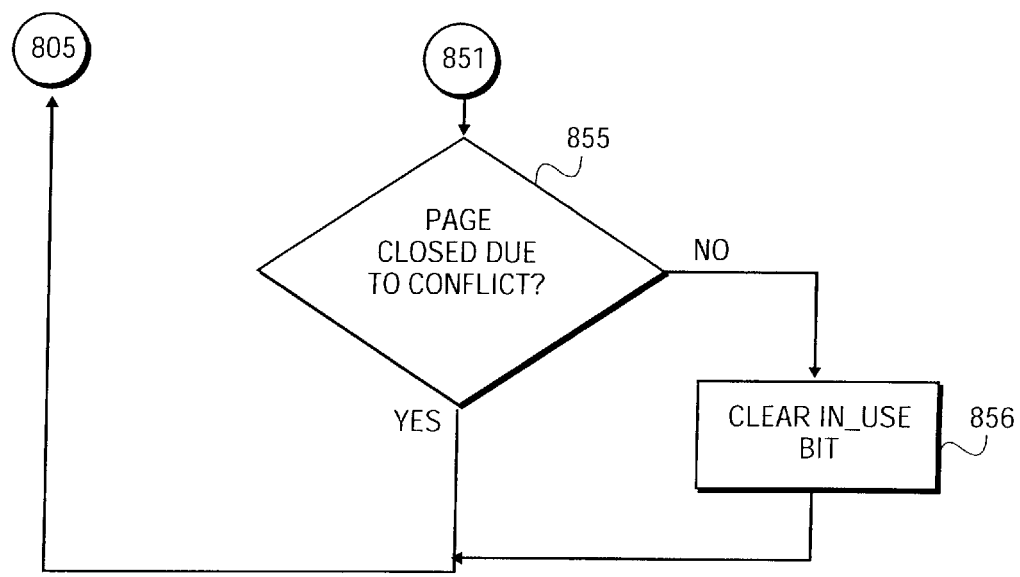
FIG. 8C illustrates a block diagram of an embodiment of the invention having a page access prediction process.
Figure 8D:
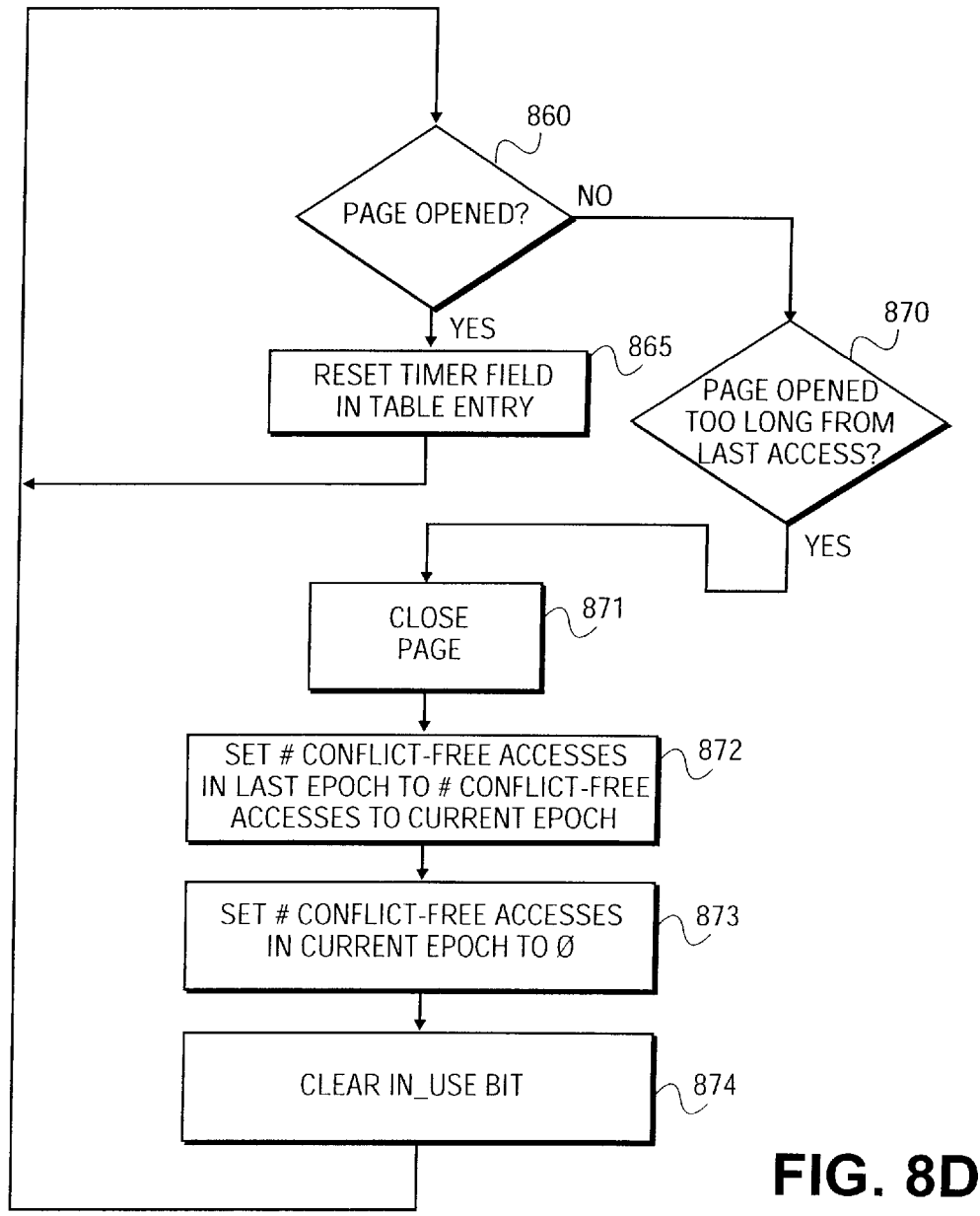
FIG. 8D illustrates a block diagram of an embodiment of the invention having a parallel process to a page access prediction process.

FIG. 8D illustrates sub-process 890. In one embodiment of the invention, sub-process 890 runs in parallel to process 800. Process 890 proceeds with Block 860. Block 860 determines if the page was opened. If the page was opened, then block 865 resets timer field 790 in page table entry 780. If block 860 determines that a page was not opened, then block 870 determines whether the page was opened longer than a predetermined time from the last access. If block 870 determines that the page has been opened longer than a predetermined time from the last access, block 871 then closes the page.

Block 872 then sets # conflict-free accesses in last epoch 728 to # conflict-free accesses in current epoch 727. Block 873 then sets # conflict-free accesses in current epoch 727 to 0. Block 874 clears in-use bit 729. Process 890 then returns to block 860. After block 865 completes, process 890 continues with block 860.

In one embodiment, intelligent auto pre-charge process 215 is combined with page access prediction process 710 in memory controller 220. It should be noted, however, that either page access prediction process 710 or intelligent auto pre-charge process 215 may be coupled with status quo memory schedulers to improve the decision making of keeping a page open or not. One should also note that page access prediction process 710 can also make use of other information related to future requests available in computer systems, such as processor or chipset pre-fetcher communicating strides with memory requests, which could also be used to improve decision making for keeping a page open or closing the page to improve memory controller 220 performance, or information communicated from the processor.

In one embodiment of the invention, scheduling means for reducing memory access latency and improving bandwidth comprises a micro-command scheduler process. In this embodiment of the invention, memory controller 220 having intelligent auto pre-charge process 215 and page access prediction process 710 included in the scheduler, also has modified scheduling to treat each memory command as an independently schedulable entity. In this embodiment of the invention, memory commands for subsequent memory requests are allowed to be inserted into idle slots between memory commands for the current memory request. Therefore, memory commands for consecutive memory requests become overlapped resulting in better utilization of memory command bus bandwidth.

Figure 9:
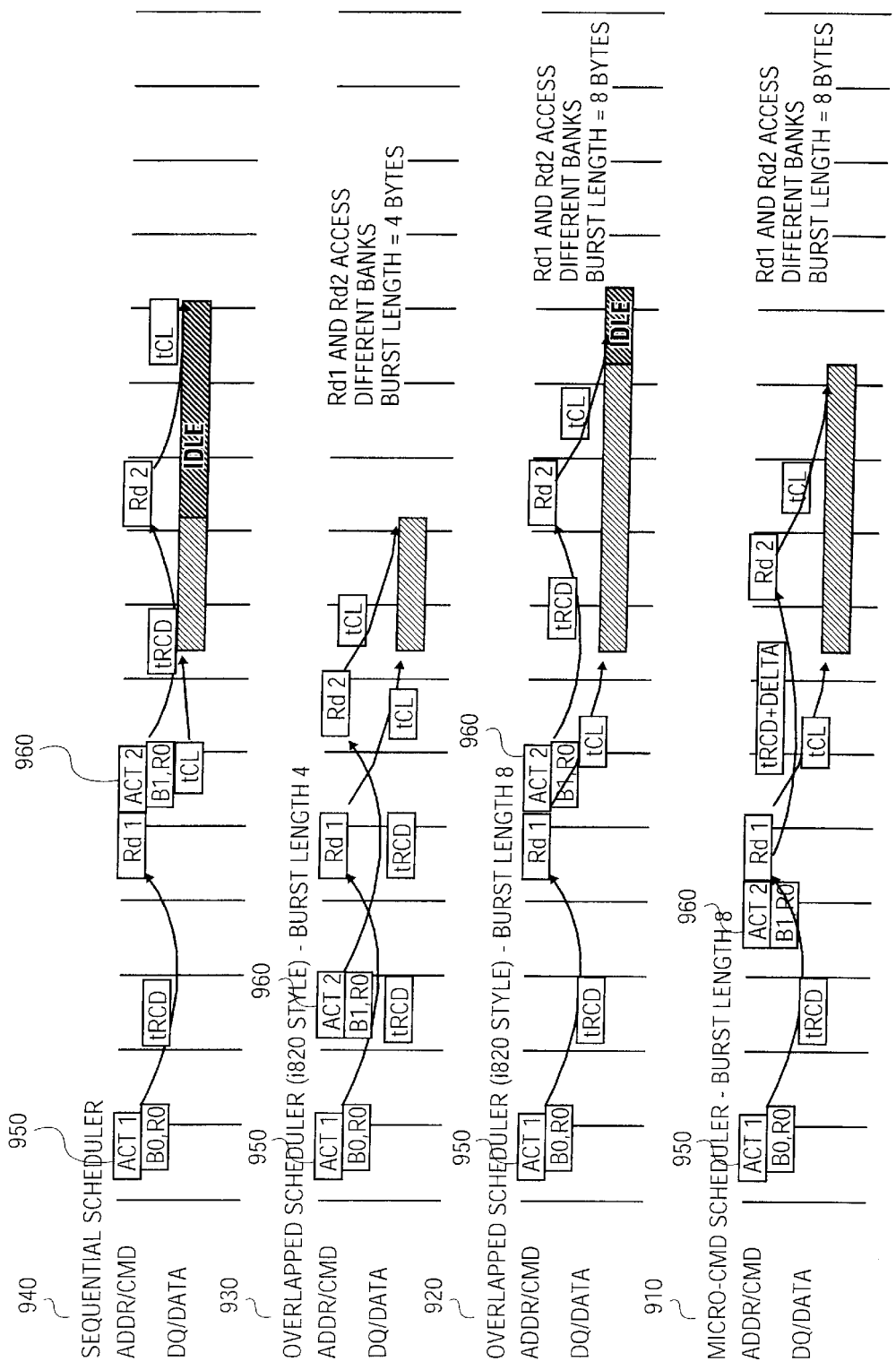
FIG. 9 illustrates a comparison of command streams of an embodiment of an invention having a micro-command scheduler with overlapped schedulers in a sequential scheduler.

FIG. 9 illustrates a comparison of an embodiment of the invention having a micro-command scheduler with an overlapped scheduler and a sequential scheduler. Overlapped memory command scheduling is based on treating a set of commands that must be generated for the current memory request as a rigid entity, which a memory scheduler attempts to overlay on top of the existing schedule of memory commands.

This approach, however, is too inflexible to succeed in all cases, and for certain values of memory timing constraints, may not show any benefit as compared to the sequential approach. This is demonstrated in FIG. 9 by timeline 920. Timeline 920 illustrates an overlapped scheduler with a burst length of 8 bytes, where the scheduler is unable to improve performance.

As can be seen in FIG. 9, the first action (Act 1) is a request made to the bank B0 and the row R0. The second request (Act 2 960) is to a different bank (B1) from Act 1. As can be seen in FIG. 9 from this particular command sequence, timeline 910 of an embodiment of the invention shows improvement over an overlapped scheduler with a burst length of 8 bytes (indicated by timeline 920) and also a sequential scheduler (indicated by timeline 940). In one embodiment of the invention, micro-command scheduling can be applied to simple schedulers (i.e., sequential) as well as overlapped schedulers to improve performance.

Figure 10:
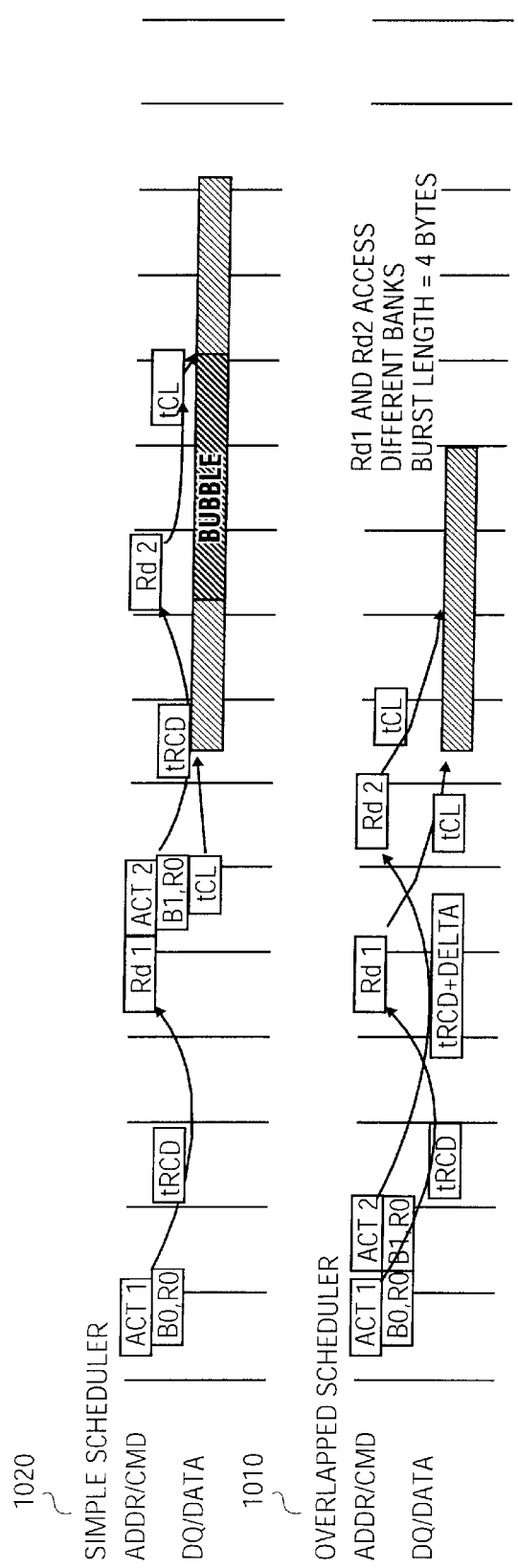
FIG. 10 illustrates a comparison of an embodiment of the invention having a micro-command scheduler that uses overlapped command scheduling with a simple scheduler.

FIG. 10 illustrates a comparison of an embodiment of the invention having a micro-command scheduler that uses overlapped command scheduling with a simple scheduler. The comparison in FIG. 10 shows two requests (Act 1 and Act 2) to different banks. Timeline 1010 illustrates an embodiment of the invention having a micro-operation based memory command scheduling for an overlapped scheduler. Timeline 1020 illustrates basic memory command scheduling for a simple scheduler. In one embodiment of the invention, micro-operation based memory command scheduling inserts each of the possible memory commands for a request independently, insuring that only the minimum timing constraints are respected.

This, however, does not preclude the relaxation (lengthening) of some timing constraints (pre-charge-activate delay, tRP, and RAS-CAS delay, tRCD) where advantageous. By allowing the lengthening of these constraints, an embodiment of the invention having micro-operation based command scheduling has a better likelihood of being able to overlap from successive memory accesses and thus hide some of the lengthening to which memory accesses would otherwise be exposed.

Figure 11A:
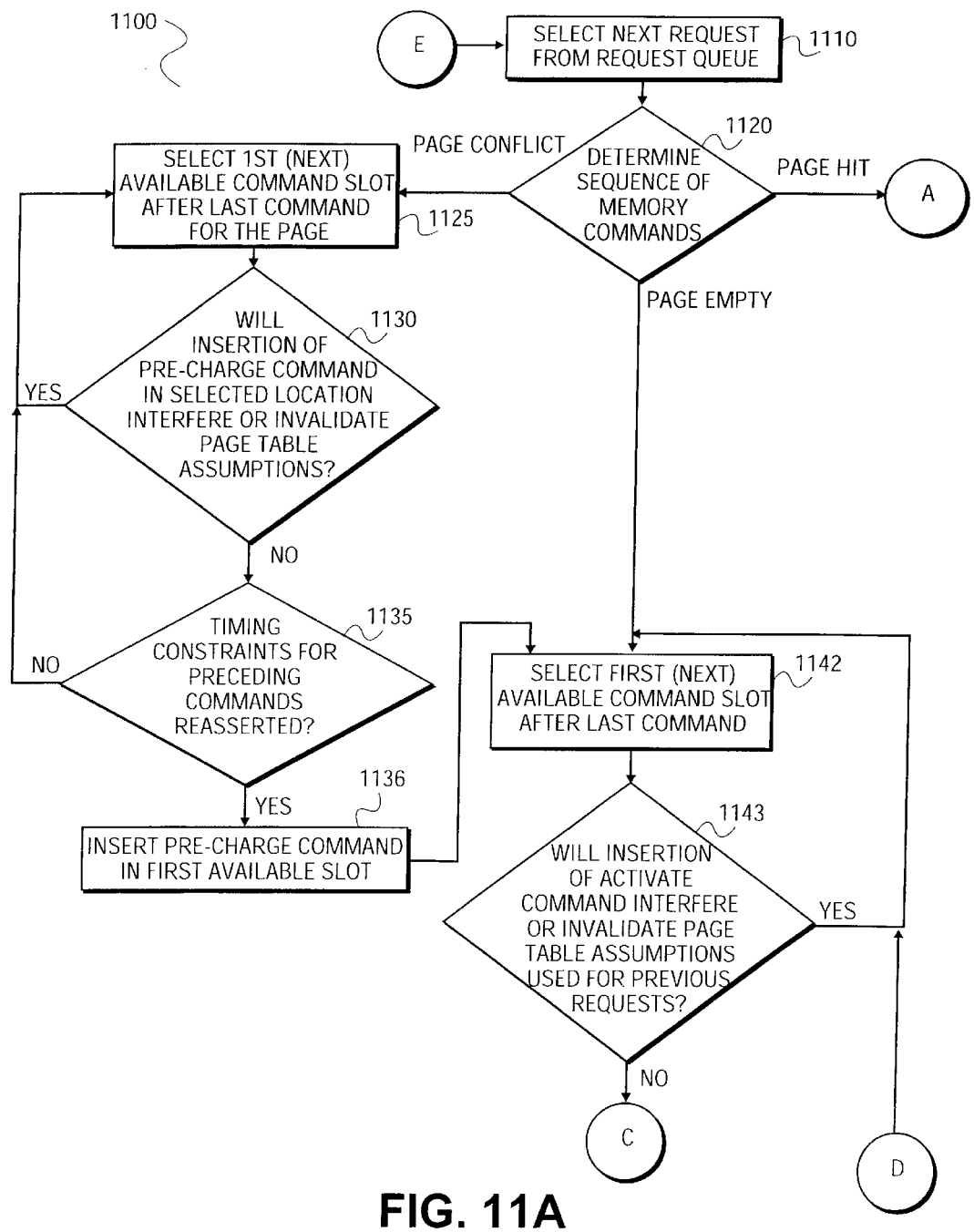
FIG. 11A illustrates a block diagram of an embodiment of the invention having micro-operation based command scheduling.
Figure 11B:
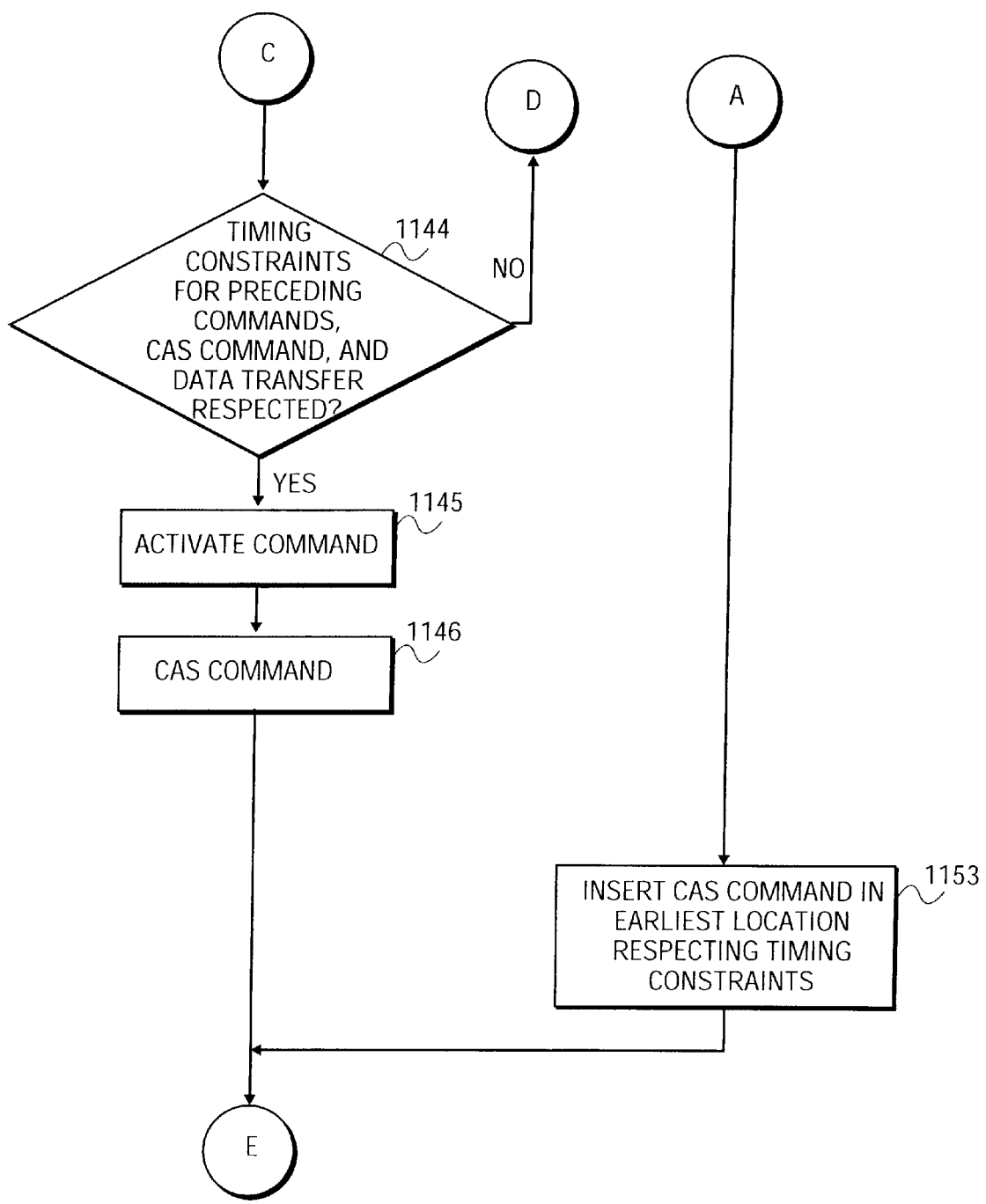
FIG. 11B illustrates a block diagram of an embodiment of the invention having micro-operation based command scheduling.

FIG. 11 illustrates a block diagram of an embodiment of the invention having micro-operation based command scheduling. Process 1100 begins with block 1110, in which memory controller 220 selects next request from memory request queue 530, and determines the sequence of memory commands that must be issued for this request. Block 1120 determines the sequence of memory commands. The sequence of commands that block 1120 determines to be maybe one of the following: page conflict: pre-charge, activate CAS; page empty: activate, CAS; page hit: CAS.

If block 1120 determines that based on a table lookup, a page conflict will result, then process 1100 continues with block 1125. In block 1125, the memory scheduler having an embodiment of the invention, attempts to schedule the operation into the first available command slot after the last command for the current page subject to the following constraints. Block 1130 determines whether an insertion of a pre-charged command in the selected location will interfere or invalidate page table assumptions that were used in placing memory commands for previous requests. If block 1130 determines that the insertion of a pre-charge command in this select location will not interfere or invalidate page table assumptions, then process 1100 continues with block 1135. Otherwise process 1100 will continue back to block 1125 to look for the next available command slot.

If block 1130 determines that the insertion of a pre-charged command in a select location will not interfere with page table assumptions that were used in placing memory commands for previous requests, then process 1100 continues with block 1135. Block 1135 determines whether timing constraints for preceding commands are respected. If timing constraints for preceding commands were not respected, then process 1100 continues back to block 1125.

If timing constraints for preceding commands have been respected, process 1100 continues with block 1136 that inserts a pre-charge command in a first available slot. Next, process 1100 continues with block 1142.

If block 1120 determines from the page table lookup that a page empty is required, block 1100 continues with block 1142. Block 1142 selects the first (next) available command slot for insertion of an activate command. Block 1143 determines whether insertion of an activate command in the selected location will interfere or invalidate page table assumptions used in placing memory commands for previous requests.

If block 1143 determines that insertion of an activate command will interfere or invalidate page table assumptions used for previous requests, then process 1100 continues with block 1142. If block 1143 determines that insertion of an activate command will not interfere or invalidate page table assumptions used for previous requests, then process 1100 continues with block 1144.

Block 1144 determines whether time constraints for preceding commands, CAS commands, and data transfers have been respected. If the time constraints for preceding commands are respected, the process 1100 continues with block 1145. Block 1145 inserts the activate command. Process 1100 continues then with block 1146 which, inserts a CAS command.

If block 1120 determines, based on memory page table lookups, that a page hit is to be sequenced, process 1100 continues with block 1153. For this CAS operation (read/write program), the command is inserted at the earliest location in a command queue allowable after preceding requested CAS operations. If an activate command was generated for a request, time restraints with respect to the activate command must be respected.

Block 1153 inserts the CAS command is in the earliest location in the command queue (respecting timing constraints) that is allowable after preceding requested CAS operations. Process 1100 then continues with block 1110.

In one embodiment of the invention, scheduling means for reducing memory access latency and improving bandwidth comprises an opportunistic write flushing policy. In this embodiment of the invention, memory controller 220 allows opportunistic write flushing with write preemption, write block-out periods and non-first-in-first-out (FIFO) write selection action. This embodiment allows for opportunistic initiation of write flush sequences, preemption of a write flush sequence as soon as a new read request arrives, write block-out periods to minimize turnaround cycles after write preemption occurs, and non-FIFO write selection in order to minimize memory resource consumption of write requests.

Figure 12:
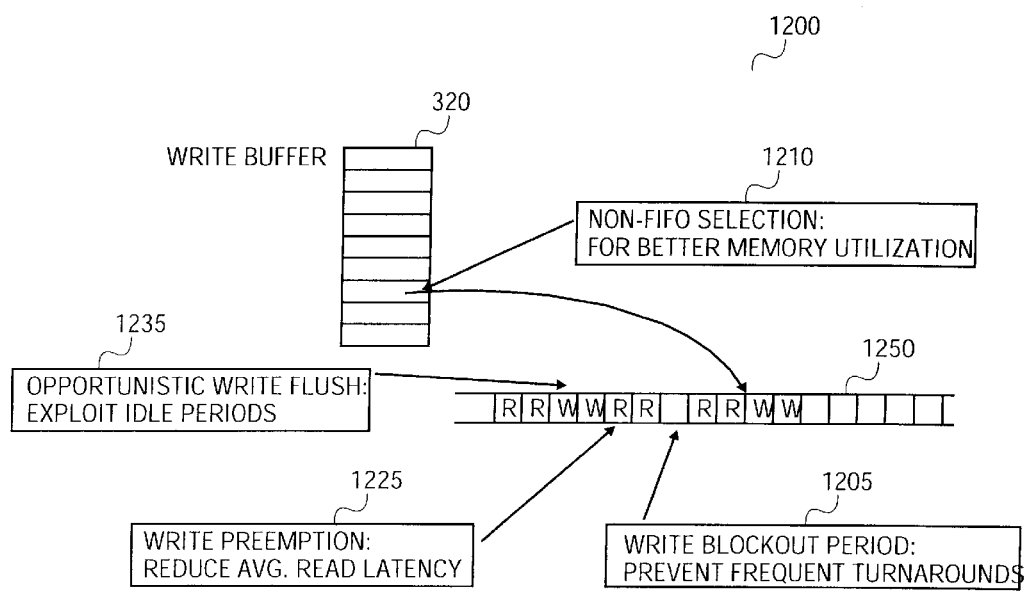
FIG. 12 illustrates an embodiment of the invention having an opportunistic write flush process.

FIG. 12 illustrates an embodiment of the invention having write buffer 320, non-FIFO selection 1210, opportunistic write flush 1235, write block-out process 1205, and write preemption process 1225. In FIG. 12, the example shown is item 1250 shows that after the first two writes in the left most write sequence, a read request arrives. This read request promptly preempts the write flush sequence. After the pre-empting reads are serviced, a write block-out period is enacted to prevent frequent read/write turnarounds.

Figure 13A:
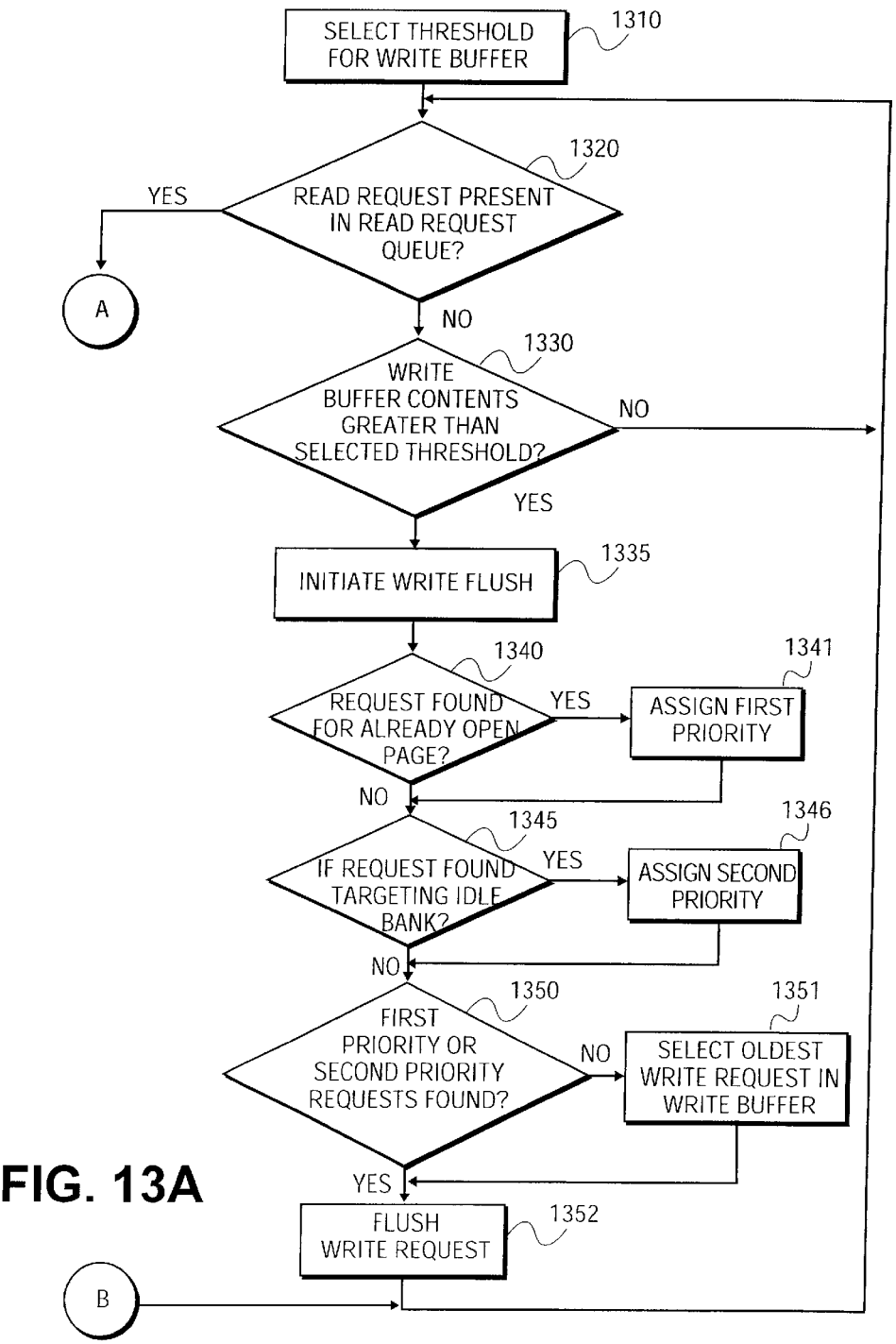
FIG. 13A illustrates a block diagram of an embodiment of the invention having opportunistic write flushing.
Figure 13B:
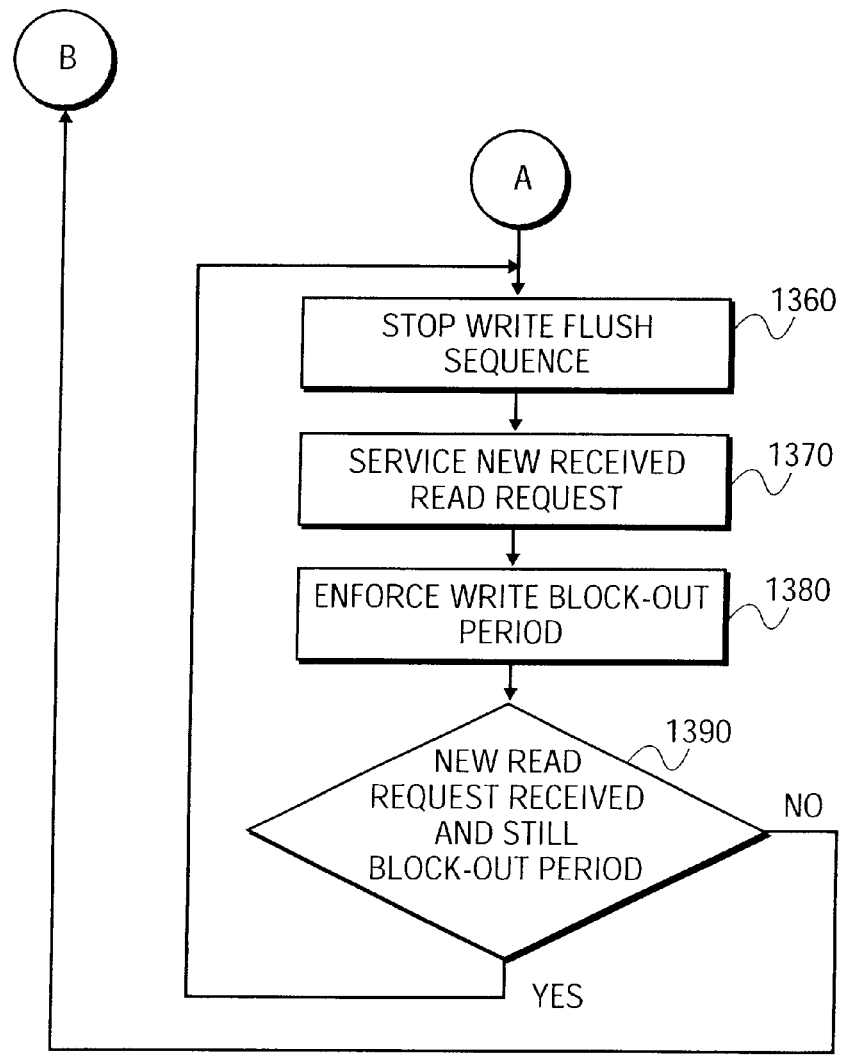
FIG. 13B illustrates a block diagram of an embodiment of the invention having opportunistic write flushing.

FIGS. 13A–B illustrates a block diagram of an embodiment of the invention having opportunistic write flushing. Process 1300 begins by selection of a threshold for a write buffer in block 1310. The selected threshold is implementation-dependent. Block 1320 determines whether read requests are present in read request queue 530. If block 1320 determines that there are no read requests present in read request queue 530, then process 1300 continues with block 1330. Block 1330 determines whether the contents in write buffer 320 exceed the selected threshold selected in block 1310. If block 1330 determines that the write buffer contents are greater than the selected threshold, then opportunistic write-flushing is allowed to commence.

Block 1335 initiates the write-flush sequence. Upon the initiation of a write-flush sequence, memory controller 220 selects from write buffer 320 a write request as follows. Block 1340 determines whether a write request is targeted at an already open memory page. If block 1340 found a targeted request to an already open memory page, then block 1341 assigns a first priority to this request. If block 1340 does not find a write request targeting an already open memory page or block 1341 has completed, then process 1300 continues with block 1345.

Block 1345 determines whether a write request is targeted at an idle memory bank (to avoid conflict with an already open page). If block 1345 does determine that a write request was found targeting an idle memory bank, then block 1346 assigns a second priority to these requests. Process 1300 continues with block 1350, which determines whether there were no first priority or second priority requests that were found. If block 1350 does determine that there were no first priority or second priority requests found, then block 1351 selects the oldest write request in the write buffer.

If block 1350 determines that first priority or second priority requests have been found, or block 1351 has completed, then block 1352 flushes the write requests in the order of priority, if a priority exists, or if no first or second priority requests were found, the selected write request in block 1351. Process 1300 then continues with block 1320 and repeats the sequence unless a new read request arrives in read request queue 530, or the selected threshold in block 1310 is not exceeded.

If a new read request arrives in read request queue 530 while memory controller 220 is in the midst of a write flush sequence, memory controller 220 immediately stops flushing new write requests, and performs as follows. After block 1320 determines that a new read request is present in read request 530, process 1300 continues with block 1360. Block 1360 stops the write flush sequence. Process 1300 continues with block 1370 wherein the newly received read request is serviced. After block 1370 is completed, block 1380 enforces a write block-out period. During the write block-out period, memory controller 220 may service further read requests, but may not initiate a new write flush sequence. This block-out period is intended to prevent frequent alternation between read and write requests.

A number of tradeoffs are associated with the precise setting of the block-out period duration. If the block-out period is set too high, performance may be degraded because of the forced inability to flush write requests to memory. If the block-out period duration is set too low, rapid alternation between read and write requests may occur, which may lead to increased turnarounds and lower performance. Block 1390 determines if a new read request has been received and whether process 1300 is still in the block-out period. If block 1390 does determine that a new read request has been received and process 1300 is still in the block-out period, process 1300 continues with block 1360. If, however, block 1390 determines that a new read request has been received and process 1300 is no longer in the block-out period, then process 1300 continues back to block 1320.

In one embodiment of the invention, scheduling means for reducing memory access latency and improving bandwidth comprises page-access oriented block-based scheduling of read requests. In one embodiment of the invention, memory controller 220 uses page-access oriented block-based scheduling of read requests. In this embodiment of the invention, whenever memory controller 220 is ready to issue a new request to memory, instead of choosing the request at the head of read request queue 530, it examines a block of requests that are at the head of read request queue 530. After calculating page-access characteristics for each request in this block, memory controller 220 uses the calculated characteristics as an index into a pre-calculated lookup table that is used to determine which particular request in a selected block should be issued first.

Figure 14:
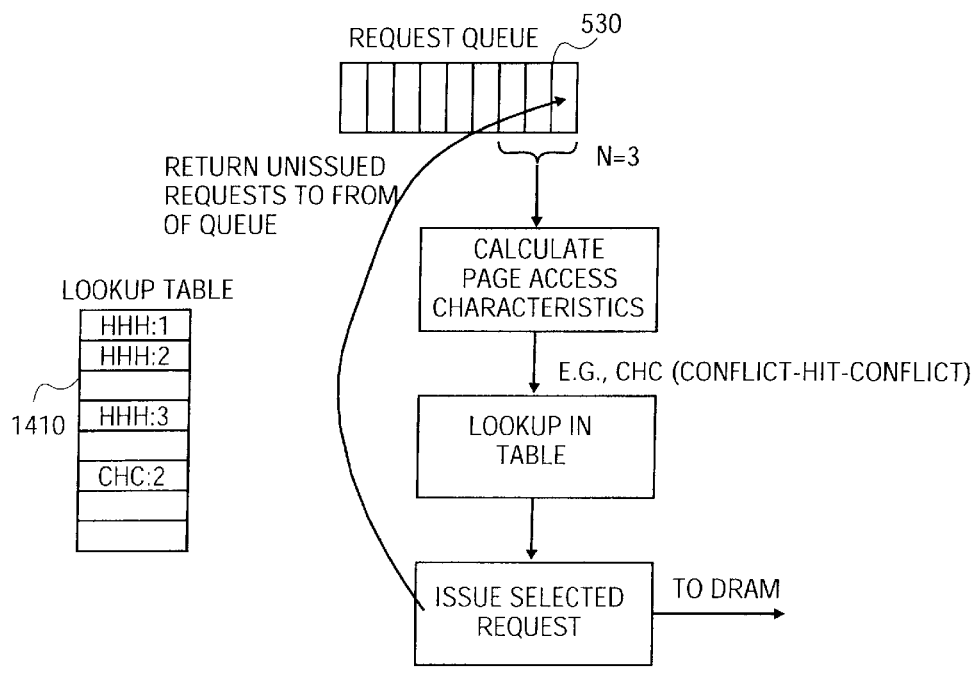
FIG. 14 illustrates an embodiment of the invention having a pre-calculated lookup table.

FIG. 14 illustrates an embodiment of the invention having pre-calculated lookup table 1410. Table indexing is done by hashing the results of determined page-access characteristics of each request in the block (page-hit, page-empty, page-miss) into a single value. This value is then used as an index into pre-calculated lookup table 1410.

By using page-access oriented block-based scheduling of read requests, non-optimal page access sequences due to excessive page conflicts can be avoided. Therefore, additional latency necessary to first close an already open page before a new page can be accessed is reduced.

Figure 15:
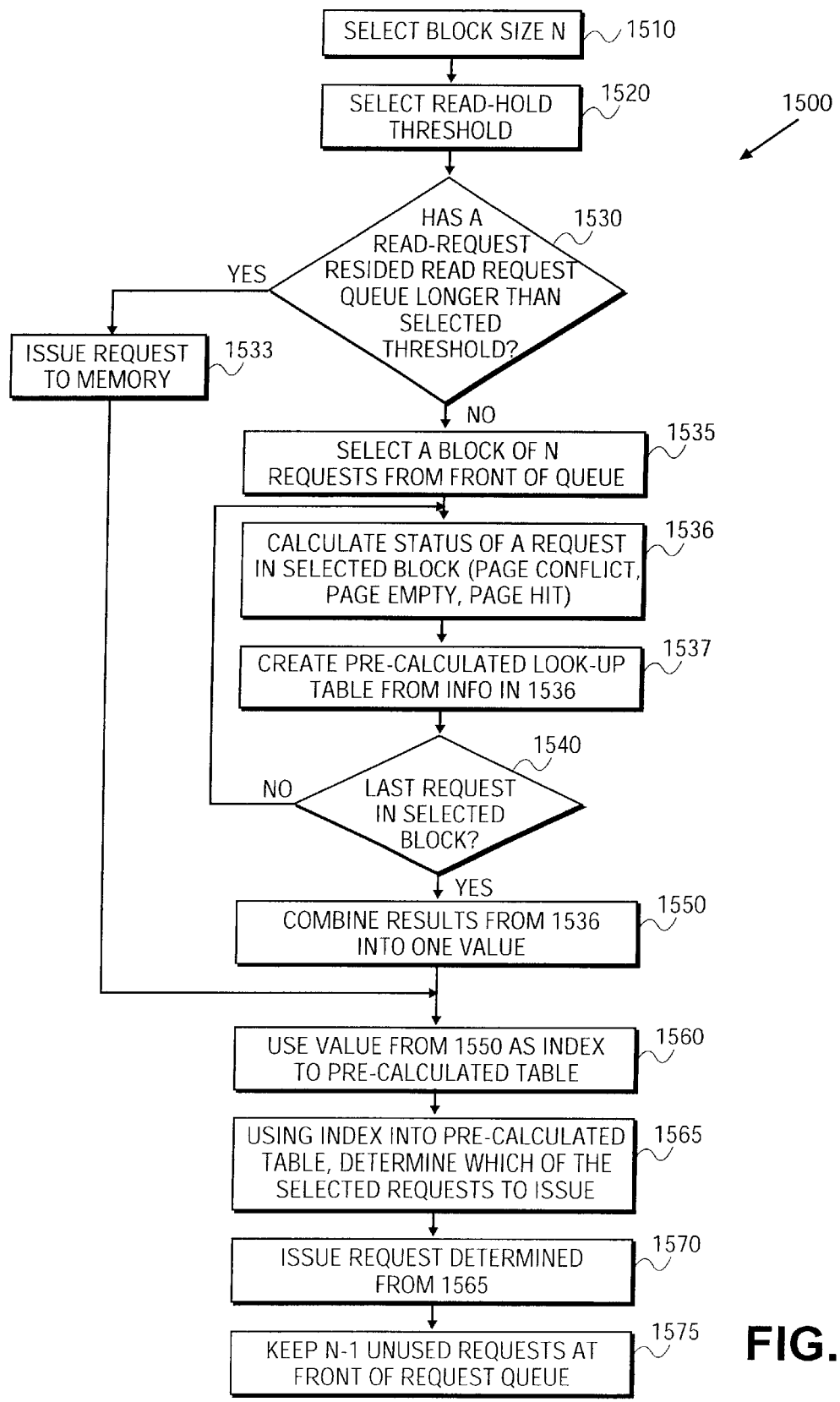
FIG. 15 illustrates a block diagram of an embodiment of the invention having a page-access oriented block-based scheduling process.

FIG. 15 illustrates a block diagram of an embodiment of the invention having page-access oriented block-based scheduling process 1500. Process 1500 is ran in memory controller 220 every time it is ready to issue a new read request. Block 1510 is where block size N is selected. In one embodiment, block size N may be two or three. One should note, however, that block size N may be any reasonable size. In block 1520, a read-hold threshold is selected.

Block 1530 determines whether a read-request has resided in read request queue 530 longer than the selected threshold. If block 1530 determines that a read request has resided in read request queue 530 longer than the selected threshold, process 1500 continues with block 1533. Block 1533 issues the read request to memory. After block 1533 has completed, process 1500 continues at block 1560. If block 1330 determines that a read-request has not resided in read request queue 530 longer than the selected threshold, process 1500 continues with block 1535.

Block 1535 selects a block of N requests (selected in block 1510) from the front of read request queue 530. Block 1336 uses the current memory page table status to calculate whether the request will be a page-conflict, a page-empty or a page-hit access. The results from block 1536 are used in block 1537. Block 1537 creates a pre-calculated lookup table from the information determined in block 1536. Pre-calculated lookup table 1410, created in block 1537, has an entry for every possible value of the aggregate page-table lookup calculation in block 1536. The value for each entry specifies which of the requests in the current block should be issued first to memory.

Block 1540 determines whether the last request in selected block N has been acted on by block 1536. If block 1540 determines that the last request in selected block N has not been acted upon yet by block 1536, process 1500 continues with block 1536. If block 1540 determines that the last request in the selected block N has been used to calculate the status of a request in block 1536, process 1500 continues with block 1550. Block 1550 combines the results calculated in block 1536 into one aggregate value.

In one embodiment of the invention, the combining of the individual page look-up results from block 1536 are combined using a hash function. In another embodiment of the invention, block 1550 combines the results calculated in block 1536 using priority encoding. One should note that other techniques in the art may also be used to combine individual page lookup results.

Process 1500 continues with block 1560 where the value created in block 1550 is used as an index to pre-calculated lookup table 1410. Process 1500 continues with block 1565 wherein the index from block 1560 is used to determine which of the selected requests should be issued to memory. Process 1500 continues with block 1570 wherein the request determined in block 1565 is issued. Block 1575 keeps N−1 unused requests at the front of read request queue 530.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a memory controller having scheduling means for reducing memory access latency and enhancing bandwidth;
   a read request queue coupled to the memory controller;
   a command queue coupled to the memory controller; and
   a memory page table coupled to the memory controller, the page table having a plurality of page table entries, the plurality of page table entries having a structure to store a memory page number, a memory page validity status, a memory page closed status, and an index to point to a slot in a shift register in the command queue.

2. The apparatus of claim 1, wherein the scheduling means for reducing memory access latency and improving bandwidth comprises an intelligent auto-precharge process.

3. The apparatus of claim 1, further comprising:
   a memory page history table coupled to the memory controller, the memory history table having a plurality of page history table entries.

4. The apparatus of claim 3, the plurality of page history table entries having a structure to store a memory page number, an in-use status, a first number of conflict-free accesses, a second number of conflict-free accesses, and a coverage.

5. The apparatus of claim 1, wherein the scheduling means for reducing memory access latency and improving bandwidth comprises a page access prediction process.

6. The apparatus of claim 1, wherein the scheduling means for reducing memory latency and improving bandwidth comprises a micro-command scheduling process.

7. The apparatus of claim 1, wherein the scheduling means for reducing memory latency comprises an opportunistic write-flushing policy, the opportunistic write-flushing policy having opportunistic initiation of write-flush sequences, preemption of write-flush sequences upon receipt of new read requests, write block-out periods, and non-first-in-first-out (FIFO) write selection.

8. The apparatus of claim 3, further comprising:
   a pre-calculated lookup table coupled to the memory controller.

9. The apparatus of claim 8, wherein the scheduling means for reducing memory latency comprises a page-access oriented block-based read request scheduling process.

10. An apparatus comprising:
    a memory controller;
    a read request queue coupled to the memory controller;
    a command queue coupled to the memory controller;
    a memory page table coupled to the memory controller, the memory page table having a plurality of page table entries;
    a memory page history table coupled to the memory controller, the memory history table having a plurality of page history table entries, the plurality of page table entries having a structure to store a memory page number, a memory page validity status, a memory page closed status, and an index to point to a slot in a shift register in the command queue; and
    a pre-calculated lookup table coupled to the memory controller; wherein the memory controller including a memory scheduling process to reduce memory access latency.

11. The apparatus of claim 10, wherein the scheduling process comprises an intelligent auto-precharge process.

12. The apparatus of claim 10, wherein the scheduling process comprises a page access prediction process.

13. The apparatus of claim 10, wherein the scheduling process comprises a micro-command scheduling process.

14. The apparatus of claim 10, wherein the scheduling process comprises an opportunistic write-flushing policy, the opportunistic write-flushing policy having opportunistic initiation of write flush sequences, preemption of write flush sequences upon receipt of new read requests, write block-out periods, and non-first-in-first-out (FIFO) write selection.

15. The apparatus of claim 10, wherein the scheduling process comprises a page-access oriented block-based read request scheduling process.

16. A system comprising:
    a processor;
    a memory controller coupled to the processor;

a bus coupled to the memory controller;

a memory coupled to the bus and the memory controller;

scheduling means for reducing memory access latency;

a read request queue coupled to the memory controller;

a command queue coupled to the memory controller; and a memory page table coupled to the memory controller, the page table having a plurality of page table entries, the plurality of page table entries having a structure to store a memory page number, a memory page validity status, a memory page closed status, and an index to point to a slot in a shift register in the command queue.

17. The system of claim 16, wherein the scheduling means for reducing memory access latency comprises an intelligent auto-precharge process.

18. The system of claim 17, further comprising:

a memory page history table coupled to the memory controller, the memory history table having a plurality of page history table entries.

19. The apparatus of claim 18, the plurality of page history table entries having a structure to store a system page number, an in-use status, a first number of conflict-free accesses, a second number of conflict-free accesses, and a coverage.

20. The system of claim 16, wherein the scheduling means for reducing memory access latency comprises a page access prediction process.

21. The system of claim 16, wherein the scheduling means for reducing memory latency comprises a micro-command scheduling process.

22. The system of claim 16, wherein the scheduling means for reducing memory latency comprises an opportunistic write-flushing policy, the opportunistic write-flushing policy having opportunistic initiation of write flush sequences, preemption of write flush sequences upon receipt of new read requests, write block-out periods, and non-first-in-first-out (FIFO) write selection.

23. The system of claim 18, further comprising:

a pre-calculated lookup table coupled to the memory controller.

24. The system of claim 23, wherein the scheduling means for reducing memory latency comprises a page-access oriented block-based read request scheduling process.

25. A system comprising:

a processor;

a memory controller coupled to the processor;

a bus coupled to the memory controller;

a memory coupled to the bus and the memory controller;

a read request queue coupled to the memory controller;

a command queue coupled to the memory controller;

a memory page table coupled to the memory controller, the page table having a plurality of page table entries;

a memory page history table coupled to the memory controller, the memory history table having a plurality of page history table entries, the plurality of page table entries having a structure to store a memory page number, a validity status, a memory page closed status, and an index to point to a slot in a shift register in the command queue; and a pre-calculated lookup table coupled to the memory controller, wherein the memory controller including a memory scheduling process to reduce memory access latency.

26. The system of claim 25, the plurality of page history table entries having a memory page number field, an in-use status field, a first number of conflict-free accesses field, a second number of conflict-free accesses field, and a coverage field.

27. The system of claim 25, wherein the scheduling process comprises an intelligent auto-precharge process.

28. The system of claim 25, wherein the scheduling process comprises a page access prediction process.

29. The system of claim 25, wherein the scheduling process comprises a micro-command scheduling process.

30. The system of claim 25, wherein the scheduling process comprises an opportunistic write-flushing policy, the opportunistic write-flushing policy having opportunistic initiation of write flush sequences, preemption of write flush sequences upon receipt of new read requests, write block-out periods, and non-first-in-first-out (FIFO) write selection.

31. The system of claim 25, wherein the scheduling process comprises a page-access oriented block-based read request scheduling process.

32. A method comprising:

determining one of scheduling automatic precharge of at least one memory page and preventing scheduling automatic precharge of at least one memory page;

predicting when to keep at least one memory page open for access by a memory controller;

scheduling insertion for each of a plurality of memory commands independently into a memory command stream while relaxing a plurality of memory command timing constraints;

performing initiation of opportunistic memory write-command flush sequences; and processing out-of-order page-oriented memory read requests.

33. The method of claim 32, determining one of scheduling automatic precharge of at least one memory page and preventing scheduling automatic precharge of at least one memory page comprising:

determining if a first memory page conflicts with a second memory page;

determining if an entry exists for the first memory page and the first memory page is valid;

scheduling memory commands and updating a plurality of page table entries if the entry exists for the first memory page and the first memory page is valid;

determining if a first command exists in a first queue for the first memory page if the entry does not exist for the first memory page and the first memory page is not valid;

scheduling memory commands and updating the plurality of page table entries if the first command exists in the first queue for the first memory page; and setting a precharge status bit.

34. The method of claim 32, predicting when to keep at least one memory page open for access by a memory controller comprising:

searching for a first memory page in a memory page history table;

determining conflict free accesses during a first period and a second period for the first memory page;

determining a coverage for the first memory page;

determining a third period, the third period having length for which the first page has been open for access by the memory controller;

determining one of keeping the first page open for access and closing the first page based on the coverage, the first period, the second period, and the third period; and updating a plurality of entries in the page history table.

35. The method of claim 32, scheduling insertion for each of the plurality of memory commands independently into the memory command stream comprising:

determining a sequence of memory commands based on a memory request in a memory request command queue;

determining timing constraints for a plurality of memory commands; and determining scheduling order to the sequence of memory commands based on timing constraints for the plurality of memory commands and status of a page table.

36. The method of claim 32, performing opportunistic memory write-command flushing comprising:

preempting a write-flush sequence upon receiving memory read requests;

determining a plurality of write block-out periods; and selecting a plurality of memory write commands in a non-first-in-first-out (FIFO) order to reduce memory resource consumption.

37. The method of claim 36, further comprising:

selecting a threshold for a write-buffer;

determining if a memory read request exists in a read request queue;

stopping a write-flush sequence if the memory read request exists in the read request queue;

enforcing one of the plurality of block-out periods if the read request exists in the read request queue;

initiating a write-flush sequence if write-buffer contents exceed the threshold;

determining a priority for a first memory read request; and scheduling a write flush request.

38. The method of claim 32, processing out-of-order page-oriented memory read requests comprising:

selecting a block size;

selecting a read-hold threshold period;

determining a period that a read-request has remained in a read-request queue;

issuing the read-request to a memory if the read-request has remained in the read-request queue longer than the read-hold threshold period;

selecting a block of read requests from a front of the read-request queue based on the block size;

determining status of the block of read requests;

creating a pre-calculated look-up table with the determined status;

combining the status of the block of read requests into a value; and determining a read request to issue based on the value and the pre-calculated look-up table.

39. An apparatus comprising a machine-readable medium containing instructions which, when executed by a machine, cause the machine to perform operations comprising:

determining one of scheduling automatic precharge of at least one memory page and preventing scheduling automatic precharge of at least one memory page;

predicting when to keep at least one memory page open for access by a memory controller;

scheduling insertion for each of a plurality of memory commands independently into a memory command stream while relaxing a plurality of memory command timing constraints;

performing initiation of opportunistic memory write-command flush sequences; and processing out-of-order page-oriented memory read requests.

40. The apparatus of claim 39, wherein determining one of scheduling automatic precharge of at least one memory page and preventing scheduling automatic precharge of at least one memory further containing instructions which, when executed by a machine, cause the machine to perform operations including:

determining if a first memory page conflicts with a second memory page;

determining if an entry exists for the first memory page and the first memory page is valid;

scheduling memory commands and update page table entries if the entry exists for the first memory page and the first memory page is valid;

determining if a first command exists in a first queue for the first page if the entry does not exist for the first memory page and the first memory page is not valid;

scheduling memory commands and update page table entries if the first command exists in the first queue for the first page; and setting a precharge status bit.

41. The apparatus of claim 39, wherein predicting when to keep at least one memory page open for access by a memory controller further containing instructions which, when executed by a machine, cause the machine to perform operations including:

searching for a first memory page in a memory page history table;

determining conflict free accesses during a first period and a second period for the first memory page;

determining a coverage for the first memory page;

determining a third period, the third period having length for which the first page has been open for access by the memory controller;

determining one of keeping the first page open for access and closing the first page based on the coverage, the first period, the second period, and the third period; and updating a plurality of entries in the page history table.

42. The apparatus of claim 39, wherein scheduling insertion for each of the plurality of memory commands independently into a memory command stream further containing instructions which, when executed by a machine, cause the machine to perform operations including:

determining a sequence of memory commands based on a memory request in a memory request command queue;

determining timing constraints for a plurality of memory commands; and determining scheduling order to the sequence of memory commands based on timing constraints for the plurality of memory commands and page table status.

43. The apparatus of claim 39, wherein performing opportunistic memory write-command flushing further containing instructions which, when executed by a machine, cause the machine to perform operations including:

preempting a write flush sequence upon receiving a memory read request;

determining a plurality of write block-out periods; and selecting memory write commands in a non-first-in-first-out (FIFO) order to reduce memory resource consumption.

44. The apparatus of claim 43, further containing instructions which, when executed by a machine, cause the machine to perform operations including:
  selecting a threshold for a write-buffer;
  determining if a memory read request exists in a read request queue;
  stopping a write-flush sequence if the memory read request exists in the read request queue;
  enforcing one of the plurality of block-out periods if the read request exists in the read request queue;
  initiating a write-flush sequence if write-buffer contents exceed the threshold;
  determining a priority for a first memory read request; and
  scheduling a write-flush request.

45. The apparatus of claim 39, wherein processing out-of-order page-oriented memory read requests further containing instructions which, when executed by a machine, cause the machine to perform operations including:
  selecting a block size;
  selecting a read-hold threshold period;
  determining a period that a read request has remained in a read request queue;
  issuing the read request to a memory if the read request has remained in the read request queue longer than the read-hold threshold period;
  selecting a block of read requests from a front of the read request queue based on the block size;
  determining status of the block of read requests;
  creating a pre-calculated look-up table with the determined status;
  combining the status of the block of read requests into a value; and determining a read request to issue based on the value and the pre-calculated look-up table.

46. An apparatus comprising:
  a memory controller having scheduling means for reducing memory access latency and enhancing bandwidth,
  a read request queue coupled to the memory controller;
  a command queue coupled to the memory controller; and
  a memory page table coupled to the memory controller, the page table having a plurality of page table entries,
  a memory page history table coupled to the memory controller, the memory history table having a plurality of page history table entries, the plurality of page history table entries having a structure to store a memory page number, an in-use status, a first number of conflict-free accesses, a second number of conflict-free accesses, and a coverage.

47. The apparatus of claim 46, further comprising:
  a memory page history table coupled to the memory controller, the memory history table having a plurality of page history table entries.

48. The apparatus of claim 47, the plurality of page history table entries having a structure to store a memory page number, an in-use status, a first number of conflict-free accesses, a second number of conflict-free accesses, and a coverage.

49. An apparatus comprising:
  a memory controller having scheduling means for reducing memory access latency and enhancing bandwidth, wherein the scheduling means for reducing memory latency comprises an opportunistic write-flushing policy, the opportunistic write-flushing policy having opportunistic initiation of write-flush sequences, preemption of write-flush sequences upon receipt of new read requests, write block-out periods, and non-first-in-first-out (FIFO) write selection.

50. The apparatus of claim 49, further comprising:
  a memory page history table coupled to the memory controller, the memory history table having a plurality of page history table entries.

51. The apparatus of claim 50, the plurality of page history table entries having a structure to store a memory page number, an in-use status, a first number of conflict-free accesses, a second number of conflict-free accesses, and a coverage.

52. An apparatus comprising:
  a memory controller;
  a read request queue coupled to the memory controller;
  a command queue coupled to the memory controller;
  a memory page table coupled to the memory controller, the memory page table having a plurality of page table entries, the plurality of page history table entries having a structure to store a memory page number, an in-use status, a first number of conflict-free accesses, a second number of conflict-free accesses, and a coverage;
  a memory page history table coupled to the memory controller, the memory history table having a plurality of page history table entries; and
  a pre-calculated lookup table coupled to the memory controller; wherein the memory controller including a memory scheduling process to reduce memory access latency.

53. The apparatus of claim 52, wherein the scheduling process comprises an intelligent auto-precharge process.

54. The apparatus of claim 52, wherein the scheduling process comprises a page access prediction process.

55. The apparatus of claim 52, wherein the scheduling process comprises a micro-command scheduling process.

56. The system of claim 52, further comprising:
  a read request queue coupled to the memory controller;
  a command queue coupled to the memory controller;
  a memory page table coupled to the memory controller, the page table having a plurality of page table entries;
  a memory page history table coupled to the memory controller, the memory history table having a plurality of page history table entries, the plurality of page table entries having a structure to store a memory page number, a validity status, a memory page closed status, and an index to point to a slot in a shift register in the command queue; and
  a pre-calculated lookup table coupled to the memory controller.

* * * * *

UNITED STATES PATENT AND TRADEMARK OFFICE
CERTIFICATE OF CORRECTION

PATENT NO.   : 6,785,793 B2
DATED        : August 31, 2004
INVENTOR(S)  : Aboulenein et al.

It is certified that error appears in the above-identified patent and that said Letters Patent is hereby corrected as shown below:

Column 1,
Line 13, delete "Modem" and insert -- Modern --.

Signed and Sealed this

Eighth Day of February, 2005

JON W. DUDAS
*Director of the United States Patent and Trademark Office*